(12) United States Patent
Li et al.

(10) Patent No.: US 10,856,329 B2
(45) Date of Patent: Dec. 1, 2020

(54) METHODS AND DEVICES FOR TRANSMITTING AND RECEIVING SIGNALS

(71) Applicant: Samsung Electronics Co., Ltd., Gyeonggi-do (KR)

(72) Inventors: Yingyang Li, Beijing (CN); Shichang Zhang, Beijing (CN); Yi Wang, Beijing (CN); Qi Li, Beijing (CN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/329,619

(22) PCT Filed: Sep. 29, 2017

(86) PCT No.: PCT/KR2017/011038
§ 371 (c)(1),
(2) Date: Feb. 28, 2019

(87) PCT Pub. No.: WO2018/062966
PCT Pub. Date: Apr. 5, 2018

(65) Prior Publication Data
US 2019/0200389 A1    Jun. 27, 2019

(30) Foreign Application Priority Data
Sep. 30, 2016  (CN) .......................... 2016 1 0873308
Sep. 30, 2016  (CN) .......................... 2016 1 0875351

(51) Int. Cl.
*H04W 74/08* (2009.01)
*H04W 16/28* (2009.01)
(Continued)

(52) U.S. Cl.
CPC ....... *H04W 74/0816* (2013.01); *H04W 16/28* (2013.01); *H04W 72/0453* (2013.01); *H04W 72/1231* (2013.01); *H04W 74/0808* (2013.01)

(58) Field of Classification Search
CPC ......... H04W 74/0816; H04W 74/0808; H04W 16/28; H04W 72/1231; H04W 72/0453; H04W 16/14; H04B 7/0695
See application file for complete search history.

(56) References Cited

U.S. PATENT DOCUMENTS

2010/0265895 A1  10/2010  Bracha
2011/0128948 A1   6/2011  Jeon et al.
(Continued)

FOREIGN PATENT DOCUMENTS

WO    WO 2009/151291    12/2009
WO    WO 2010121070    10/2010
(Continued)

OTHER PUBLICATIONS

PCT/ISA/210 Search Report issued on PCT/KR2017/011038 (pp. 3).
(Continued)

*Primary Examiner* — Walli Z Butt
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments of the present disclosure provides method for transmitting signals on an Unlicensed Frequency Band (UFB), comprising: performing, by a transmitting node, a first type of Listen Before Talk (LBT) on a direction i; transmitting, by the transmitting node, signals on a direc-
(Continued)

tion j after passing the first type of LBT, wherein the direction i is omnidirectional, or one or multiple beam directions corresponding to the direction j. The technical scheme of the present disclosure may be applied to high-frequency-band signal transmission and LBT and avoid interference with other nodes on the UFB.

15 Claims, 19 Drawing Sheets

(51) Int. Cl.
*H04W 72/04* (2009.01)
*H04W 72/12* (2009.01)

(56) References Cited

U.S. PATENT DOCUMENTS

| | | | |
|---|---|---|---|
| 2016/0192395 A1* | 6/2016 | Yoo | H04B 7/0874 370/329 |
| 2017/0118774 A1* | 4/2017 | Cariou | H04W 74/0816 |
| 2017/0195889 A1 | 7/2017 | Takeda et al. | |
| 2017/0311320 A1 | 10/2017 | Lunttila et al. | |
| 2018/0070353 A1* | 3/2018 | Yang | H04W 72/0446 |
| 2019/0268939 A1* | 8/2019 | Yang | H04W 72/042 |
| 2019/0373635 A1* | 12/2019 | Yang | H04B 7/0408 |

FOREIGN PATENT DOCUMENTS

| | | |
|---|---|---|
| WO | WO 2016006449 | 1/2016 |
| WO | WO 2016045744 | 3/2016 |

OTHER PUBLICATIONS

PCT/ISA/237 Written Opinion issued on PCT/KR2017/011038 (pp. 8).
LG Electronics, 3GPP TSG RAN WG1 meeting #84bis, R1-162473, Busan, Korea, Apr. 2, 2016, LBT schemes in LAA UL, pp. 13.
Huawei, HiSilicon, 3GPP TSG RAN WG1 84bis Meeting, R1-162602, Busan, Korea, Apr. 1, 2016, Discussion on the application of LBT options in eLAA, pp. 5.
Intel Corporation, "Considerations on the Impact of Unlicensed Access to 5G Design", R2-165003, 3GPP TSG-RAN WG2 #95, Aug. 22-26, 2016, 4 pages.
Samsung, "Robust Design to Support Various Spectrums in NR", R2-165174, 3GPP TSG-RAN WG2 Meeting #95, Aug. 22-26, 2016, 4 pages.
European Search Report dated Jun. 18, 2019 issued in counterpart application No. 17856852.3-1215, 8 pages.

* cited by examiner

[Fig. 1]
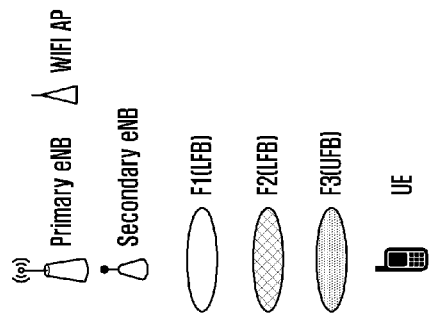
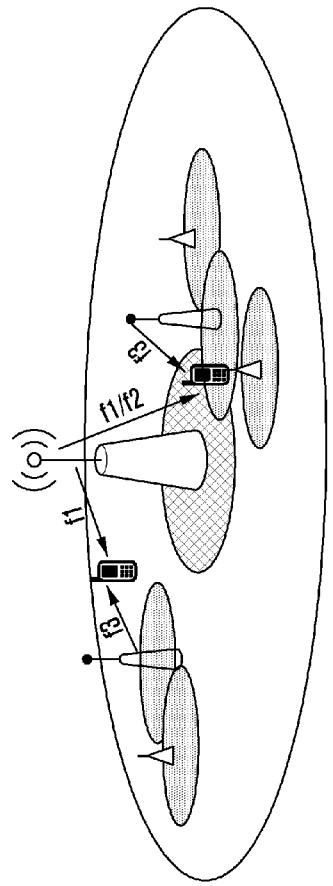
[Fig. 2]
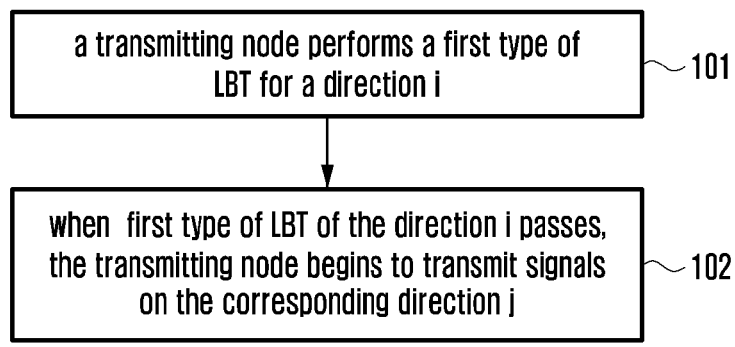

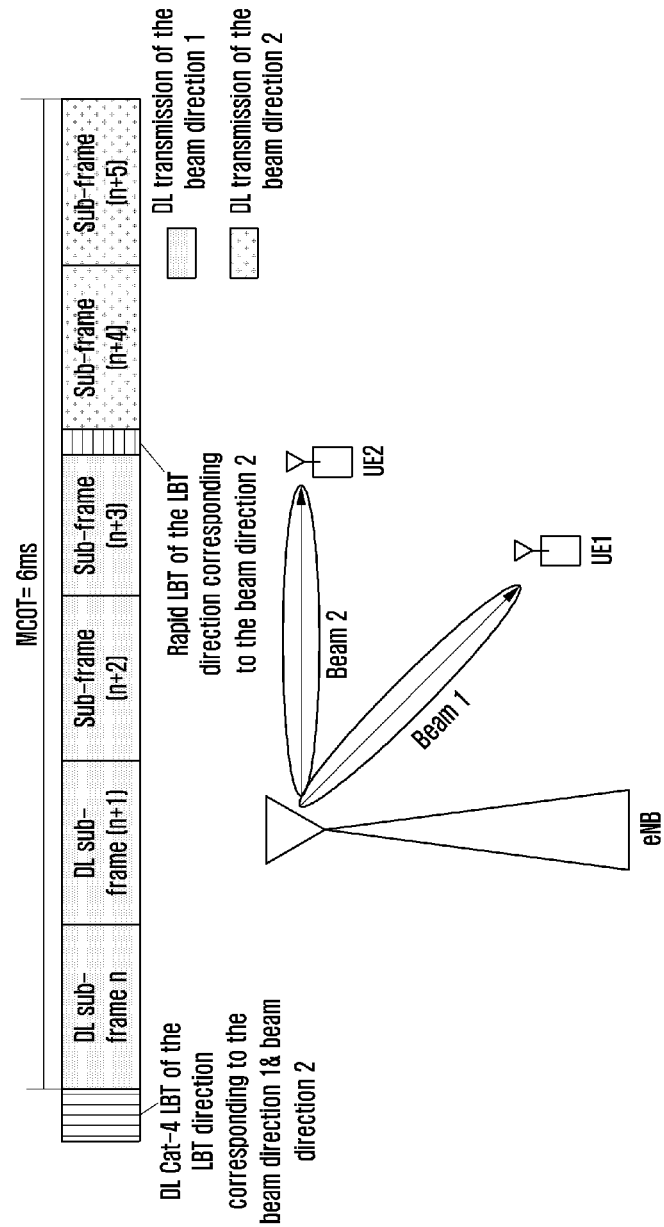
[Fig. 3]

[Fig. 4]
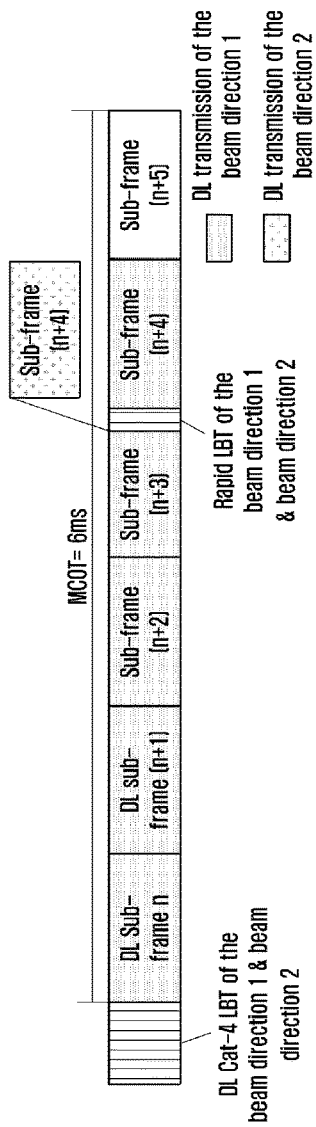
[Fig. 5]
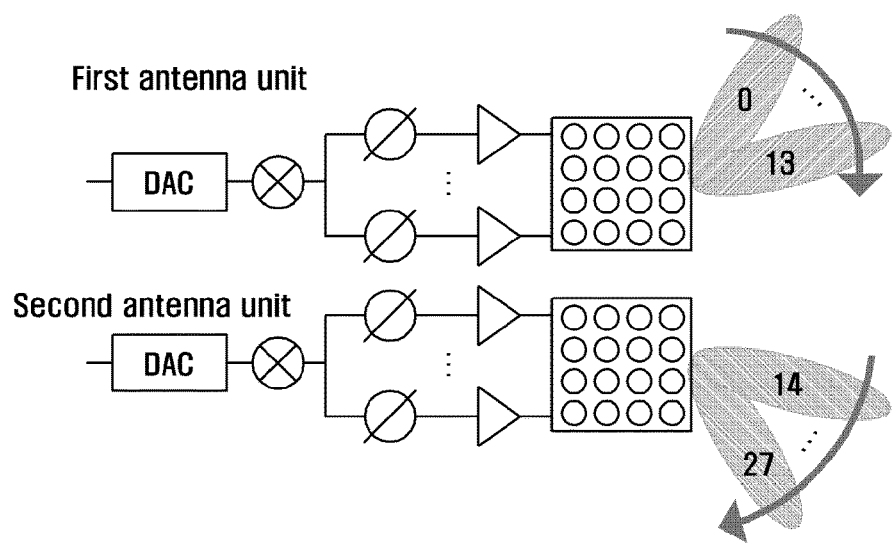

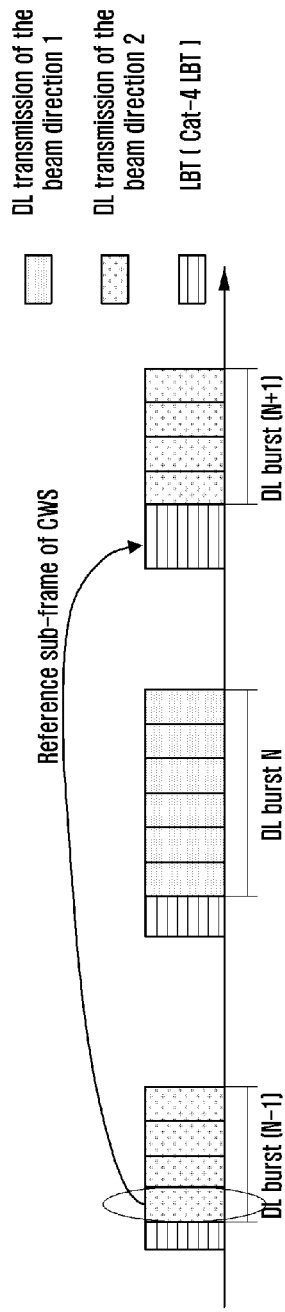

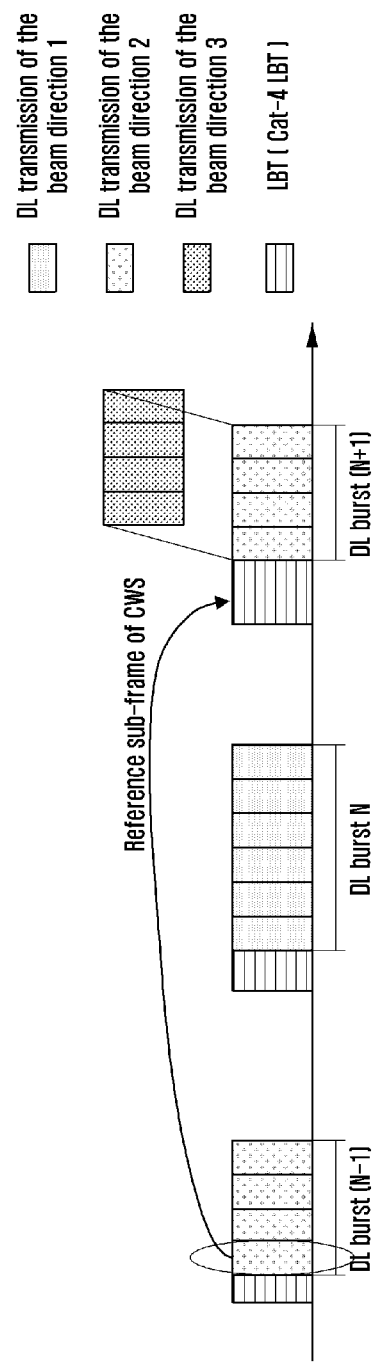

[Fig. 8]
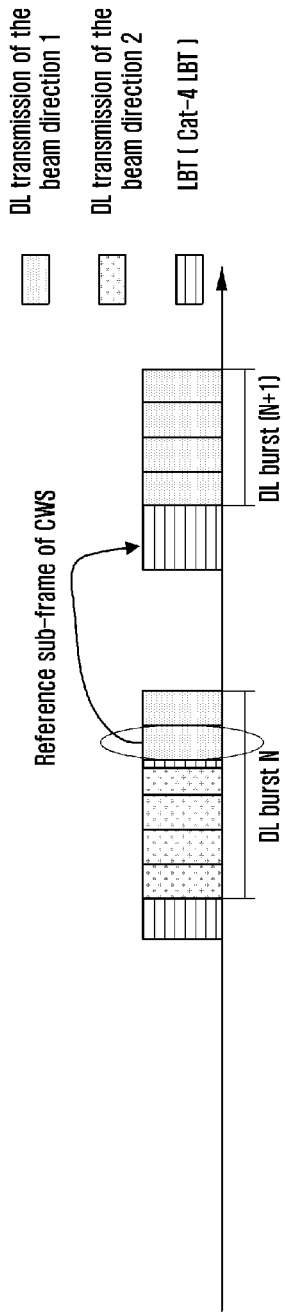

[Fig. 9]
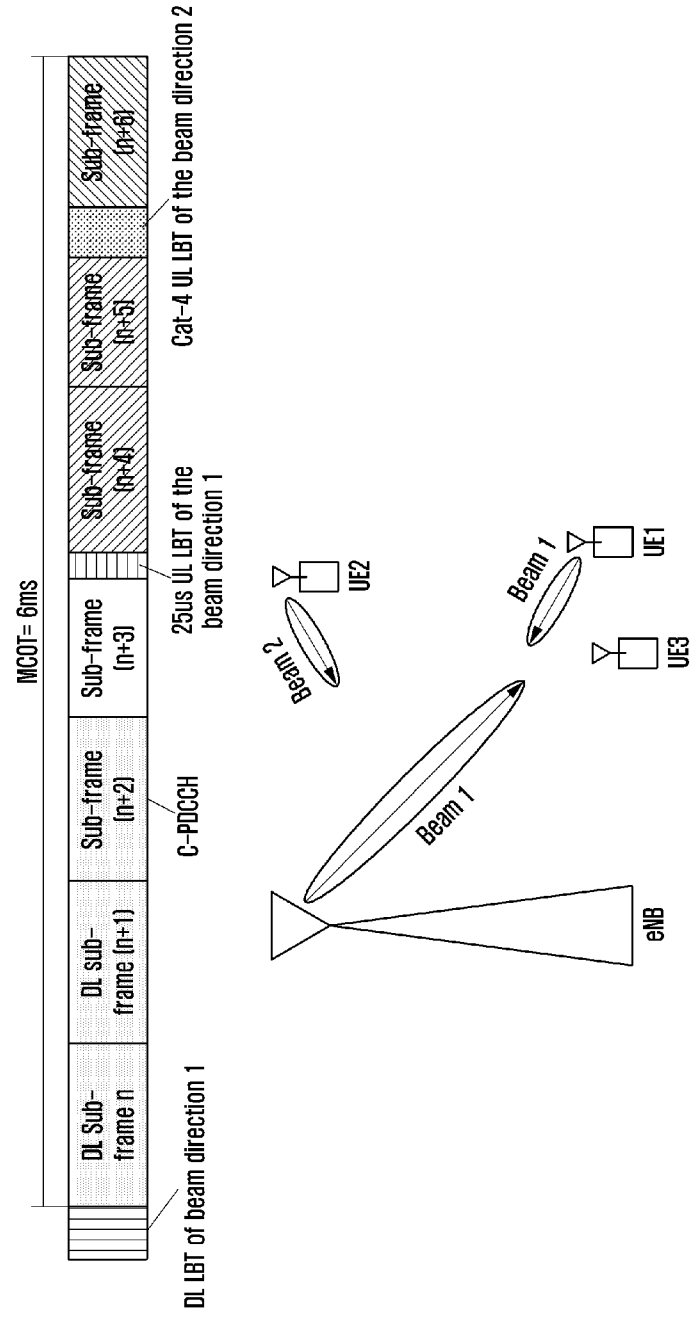

[Fig. 10]
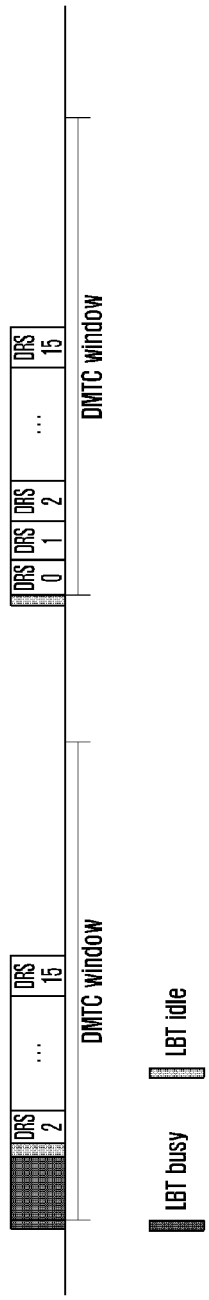

[Fig. 11]
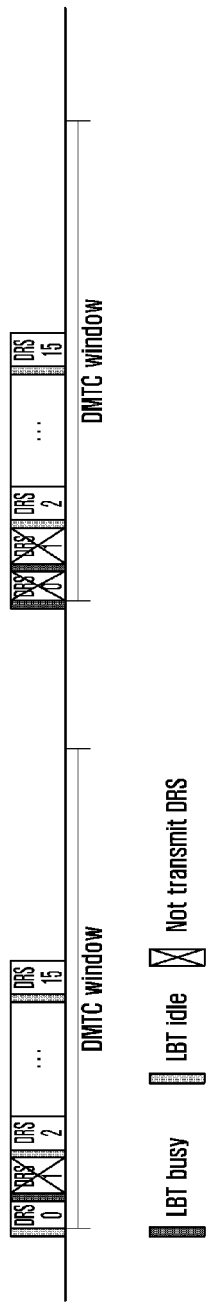

[Fig. 12]
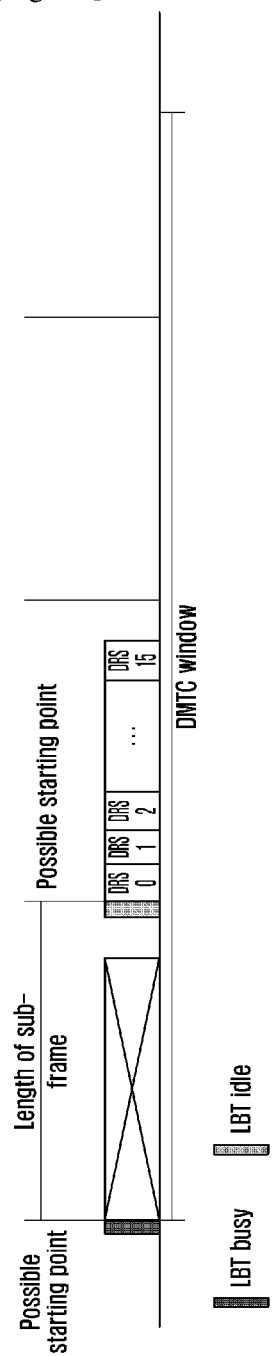

[Fig. 13]
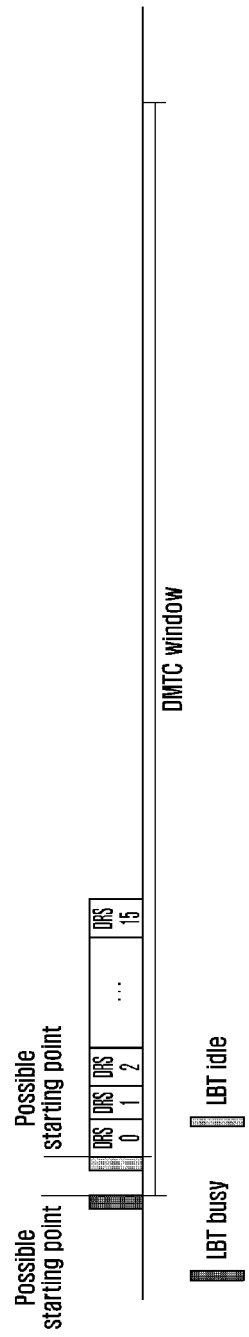

[Fig. 14]
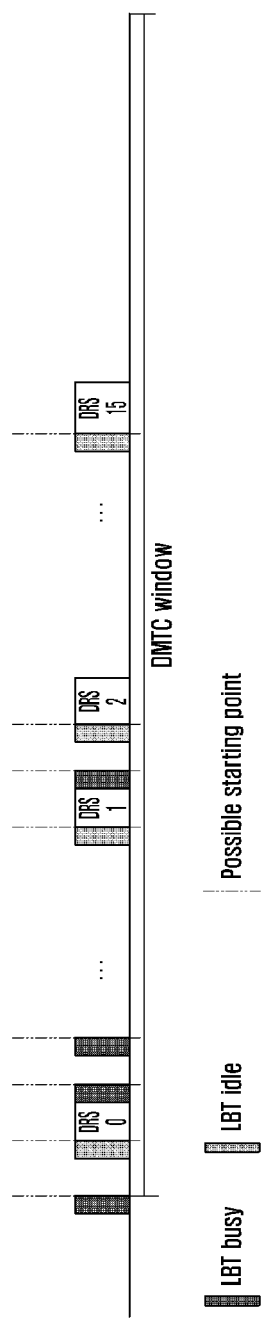

[Fig. 15]
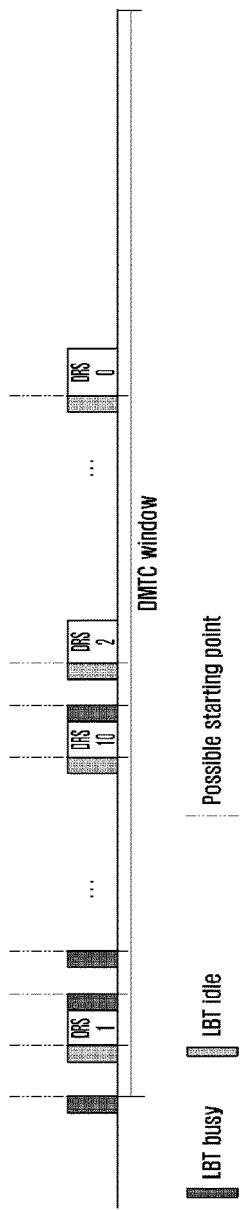
[Fig. 16]
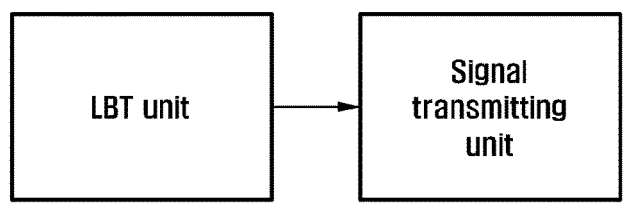
[Fig. 17]
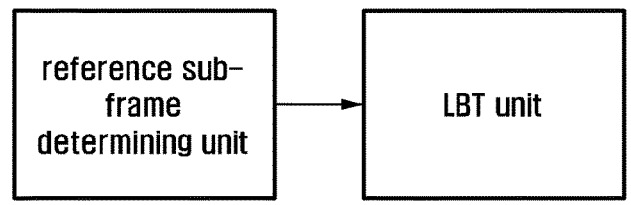

[Fig. 18]
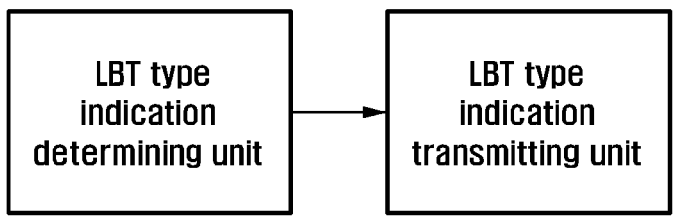
[Fig. 19]
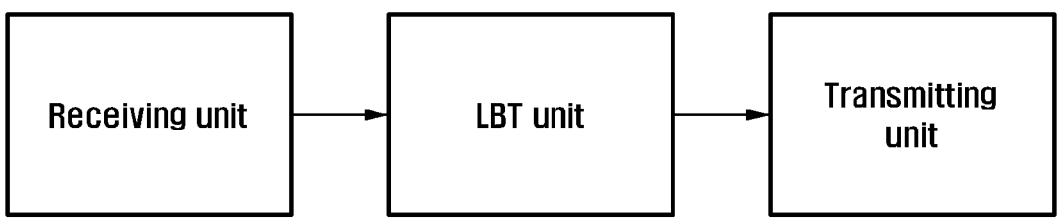
[Fig. 20]
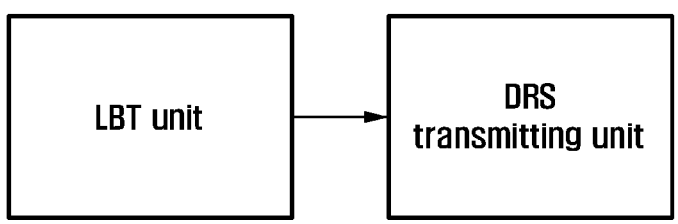

[Fig. 21]
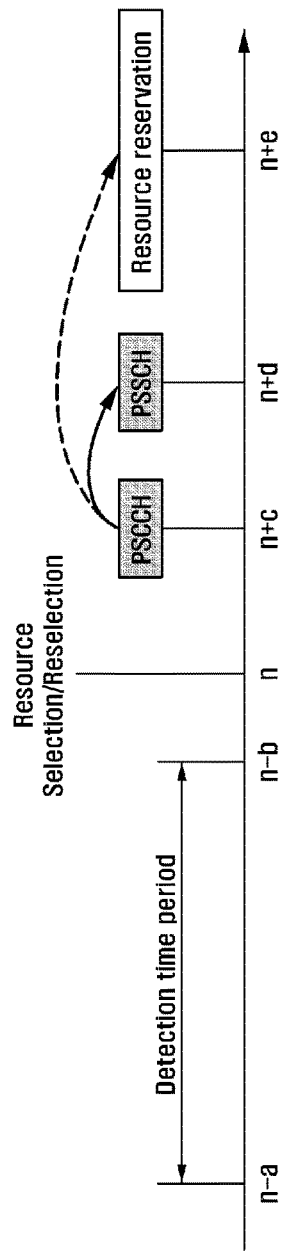
[Fig. 22]
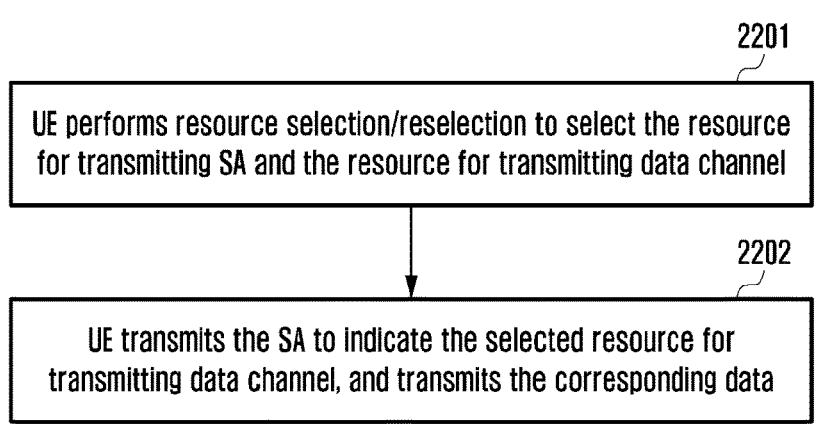

[Fig. 23]
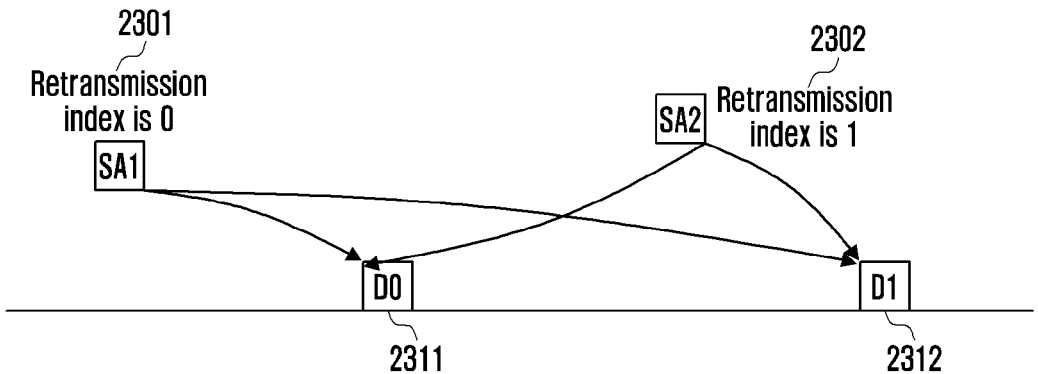
[Fig. 24]
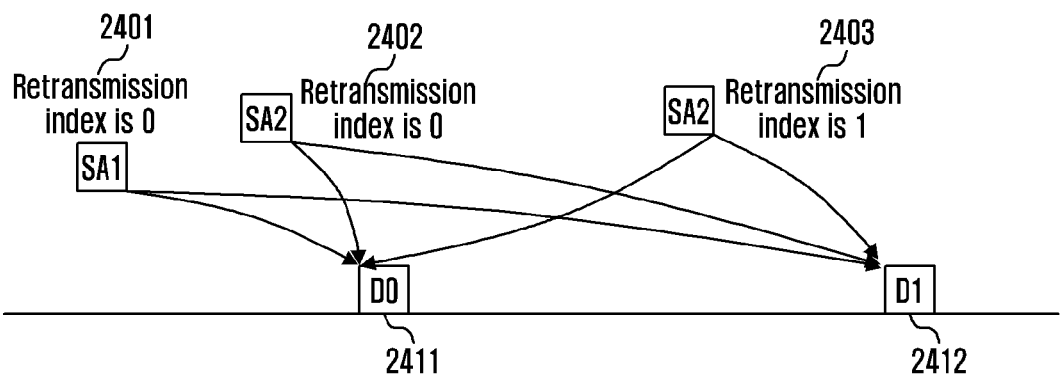
[Fig. 25]
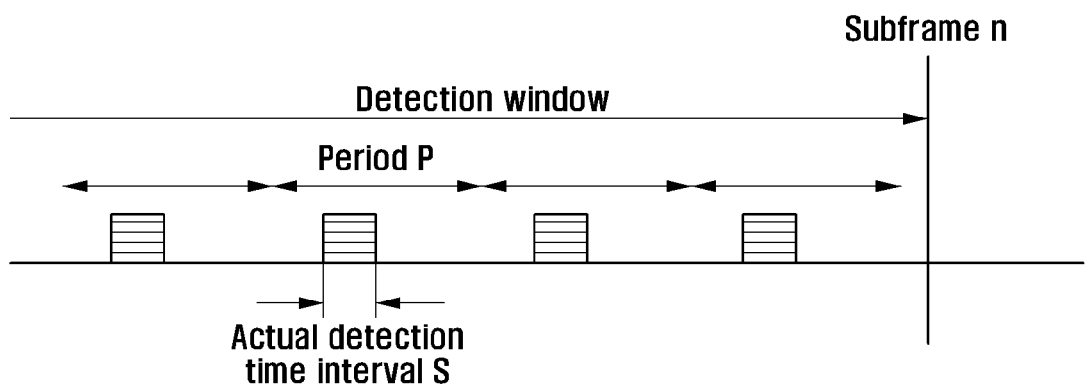

[Fig. 26]
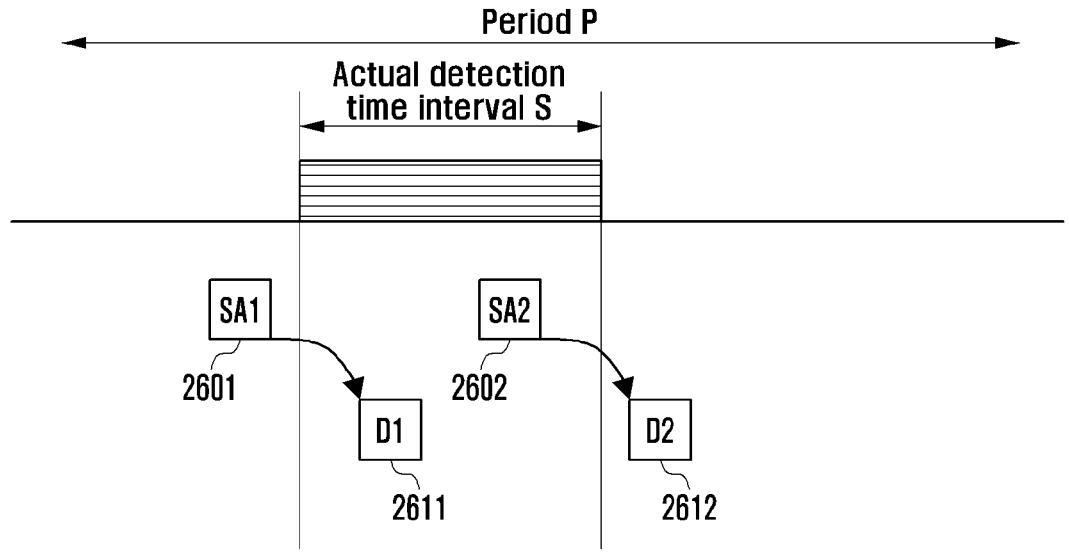
[Fig. 27]
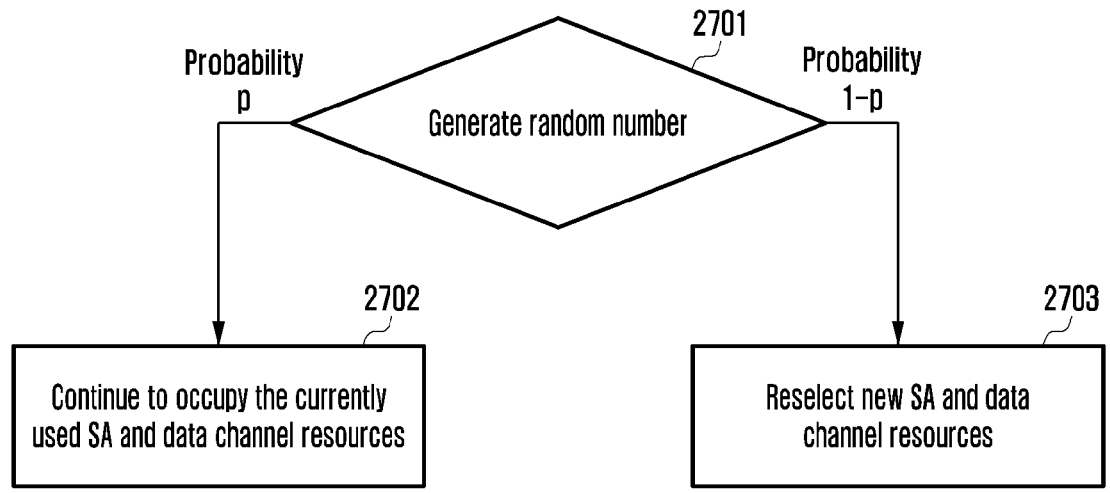
[Fig. 28]
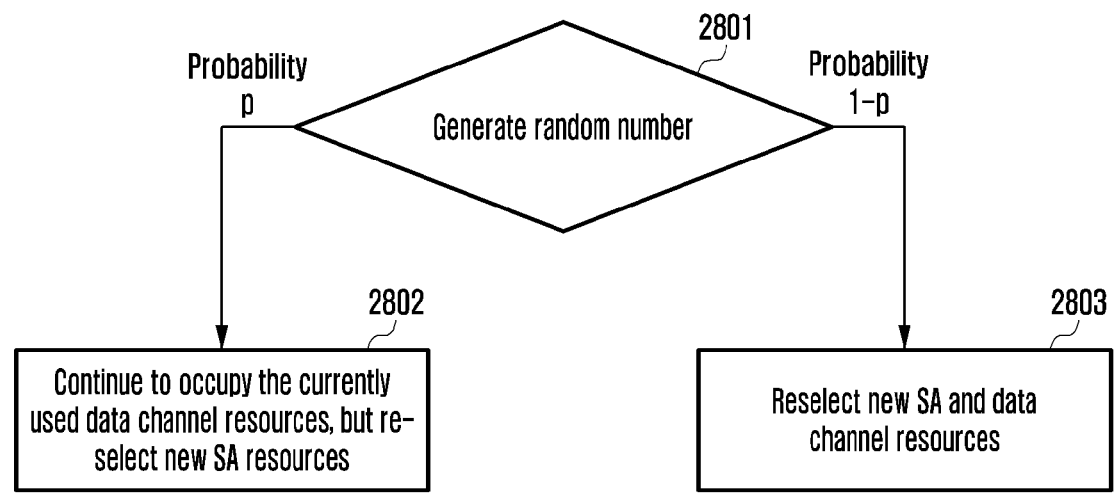

[Fig. 29]
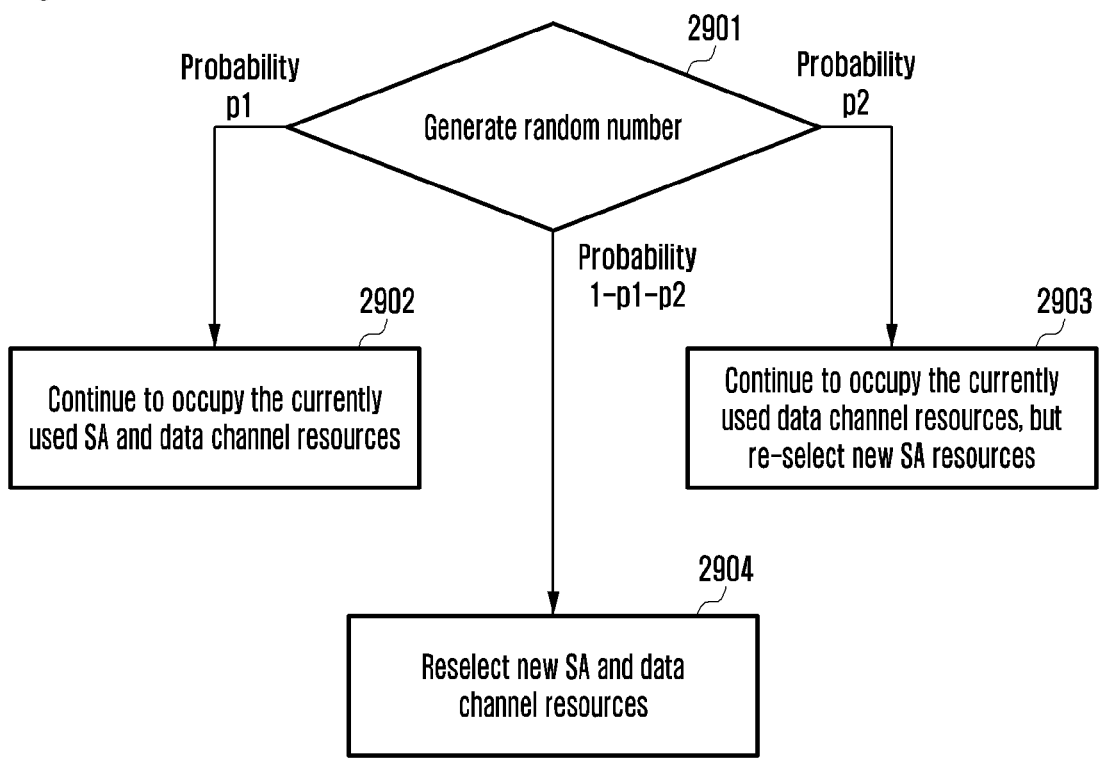

[Fig. 30]
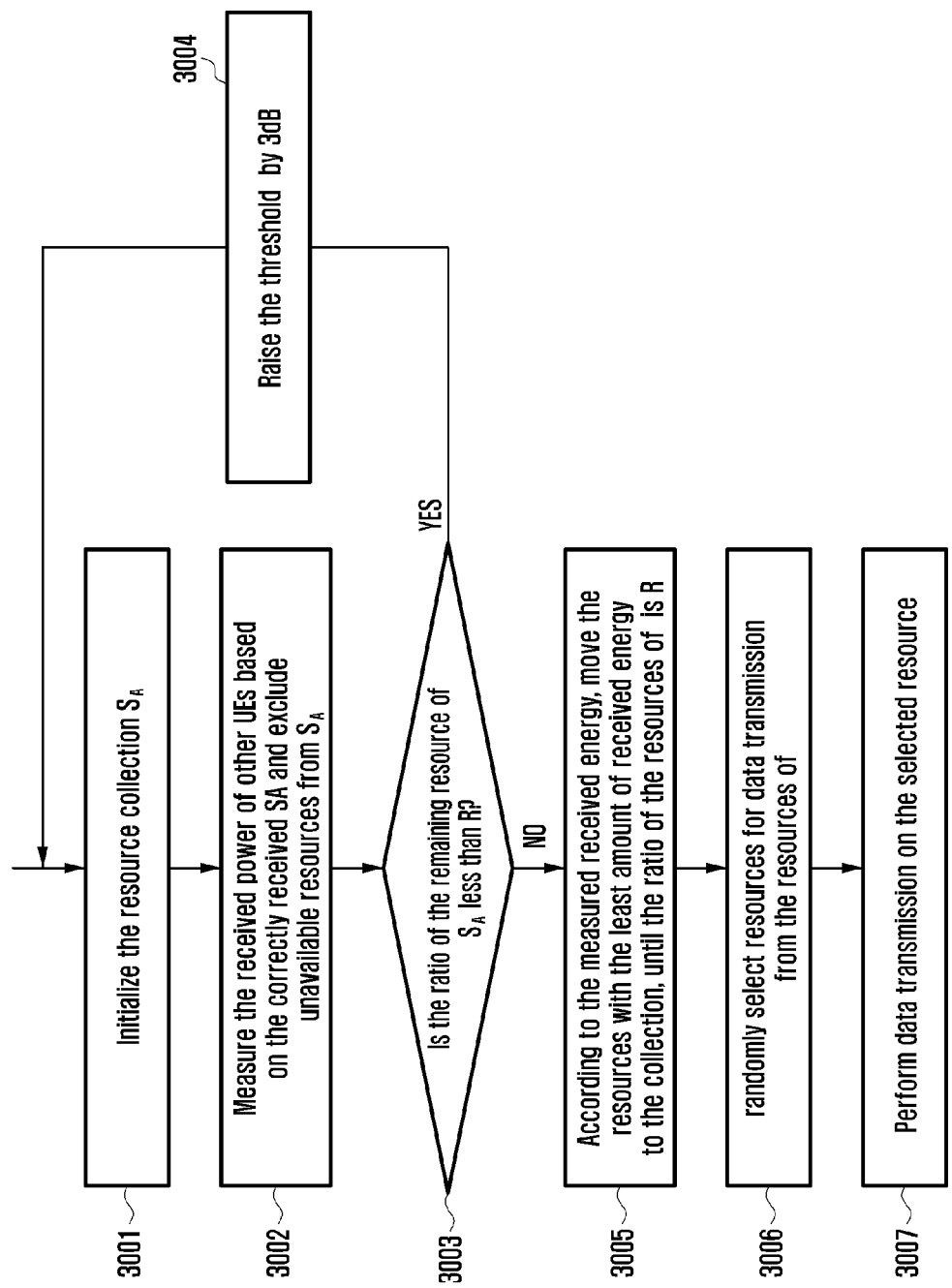
[Fig. 31]
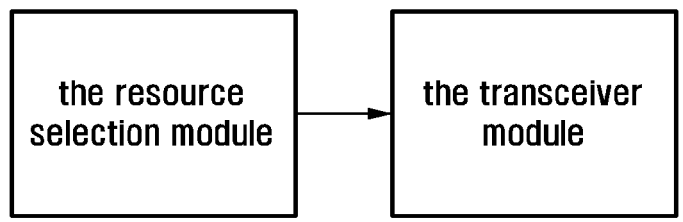

METHODS AND DEVICES FOR TRANSMITTING AND RECEIVING SIGNALS

PRIORITY

This application is a National Phase Entry of PCT International Application No. PCT/KR2017/011038 which was filed on Sep. 29, 2017, and claims priority to Chinese Patent Application Nos. 201610873308.6 and 201610875351.6, both of which were filed on Sep. 30, 2016, the content of each of which is incorporated herein by reference.

TECHNICAL FIELD

The present disclosure relates to a mobile communication technology field, and more particularly, to methods and devices for transmitting and receiving signals.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As the imbalance between explosion of users' demand for high bandwidth wireless services and scarcity of spectrum resources becomes more and more severe, the mobile operator begins to consider taking unlicensed frequency bands (also called unauthorized frequency bands) as supplement of Licensed Frequency Bands (LFB)s. The 3rd Generation Partnership Project (GPP) has started to research on deploying Long Term Evolution (LTE) on an UFB (the LTE system deployed on the UFB is called a Licensed-Assisted Access (LAA) system). With the effective carrier aggregation of the UFBs and LFBs, how to effectively improve utilization of the whole network's frequency spectrum on the premise of not dramatically affecting other technologies of the UFB is a problem to be solved. In order to support more flexible networking, the topic that the UFB and LFB work in a Dual Connectivity (DC) mode is worthy of study. As shown in FIG. 1, two eNBs may provide services for the UE, one of them works as a master eNB, which provides a relatively large coverage via the LFB, and the other works as a secondary eNB, which provides hotspot services via the UFB, as shown in FIG. 1.

The UFBs are usually allocated for some other purposes, such as Wireless Fidelity (WiFi) of a radar or a 802.11 series. On the UFB, how to avoid mutual interference between the LAA system and other wireless system, such as radar or WiFi is a critical problem. Clear Channel Assessment (CCA) is a mechanism for avoiding conflict, which is widely used on the UFB. A Mobile Station (STA) needs to detect a wireless channel before transmitting signals, only when the wireless channel is idle, the STA may occupy the wireless channel to transmit the signals. This listened first and then talked scheme is called the LBT. The LAA may also need to follow the LBT scheme and perform energy detection for the channel. Usually, transmitting antennas or receiving antennas of the eNB or UE in the LAA system are omnidirectional antennas, or directional antennas with a relative large angle. Therefore, no matter transmission or LBT, the antennas are the omnidirectional antennas for practical purpose.

With rapid development of the information industry, growing requirements, especially those of mobile Internet and Internet bring unprecedented challenge to the future mobile communication technologies. In order to address the unprecedented challenge, face to the year 2020, the communication industry and academia has started research on the 5rd (5G) mobile communication technology. The 3GPP also has started standardization work of 5G (New Radio (NR)). It is anticipated that the NR system may work at low frequency band resources and the high frequency band resources, such as about 100 G, and the above frequency band resources may include: licensed frequency bands and unlicensed frequency bands. The unlicensed frequency bands mainly include 5 GHz frequency band the 60 GHz frequency band. On the 60 GHz frequency band, in order to compensate extremely-high path loss, the beam forming may be performed adopting massive Multiple-Input Multiple-Output (MIMO), which is based on a large scale antenna array, to obtain gain. Through adopting directional transmission on the UFBs, interference between transmitting nodes of different directions may be effectively reduced and inherent problems of directionality may be introduced. The LBT mechanism of the transmitting node and a signal transmission mode of the transmitting node also need to be accordingly adjusted based on the characteristics of the directionality to obtain maximum gain and avoid interference with other nodes on the UFB.

Device to device (D2D) communication technology has been accepted by 3GPP standards because of its great potential value in the public safety field and the general civilian communication field. And some functions of D2D has been standardized in 3GPP Rel-12, which includes a: mutual discovery of D2D terminals in the scenario of In Coverage (IC) and broadcast communications between D2D terminals in the scenario of In Coverage (IC), Partial Coverage (PC) and Out of Coverage (OC).

The 3GPP Rel-12 standards define two modes of D2D broadcast communications, which are referred to as Mode 1 and Mode 2. Wherein:

Mode 1 requires that the UE sending the D2D broadcast communication must be a UE In Coverage, hereinafter, referred to as ICUE. The UE obtain configuration information of a resource pool of a Physical Sidelink Control CHannel (PSCCH) of Mode 1 through receiving a system broadcast signal sent by an eNB, Wherein, the configuration information includes cycles of the PSCCH and the position of subframe used for sending the PSCCH in each cycle, and the position of Physical Resource Block (PRB) used for sending the PSCCH in each subframe. When a UE supporting the broadcast communication of Mode 1 has data to transmit, the UE applies for special communication resources of Mode 1 from the eNB through a specific Buffer Status Report (BSR). Then, the UE detects the Sidelink Grant from the eNB before each PSCCH cycle, and obtains resource the position of resources used to send PSCCH and Physical Sidelink Shared Channel (PSSCH) in the PSCCH cycle. In Mode 1, by centralized control of the eNB, resources conflicts between different UEs may be avoided.

The UE transmitting D2D broadcast communications through Mode 2 may be either an ICUE or a UE Out of the Coverage hereinafter, referred to as OCUE. The ICUE obtains the configuration information of PSCCH resource pool of Mode 2 and the configuration information of associated configuration of the PSSCH resource pool by receiving eNB system broadcast signaling from the eNB. Wherein, the PSSCH resource pool includes: the position of subframe used for transmitting the PSSCH in the associated PSCCH cycle, and the position of PRBs used for transmitting the PSSCH in each subframe. In each PSCCH cycle, the ICUE randomly selects the resources for transmitting the PSCCH and associated PSSCH. The OCUE determines the configuration of PSCCH resource pool and that of associated PSSCH resources pool of Mode 2 through the pre-configuring information. The way of the resource selection way of the OCUE is the same as that of the ICUE. In the PC scenario, the resource pool configuration of Mode 2 pre-configured by OCUE is related to the carrier frequency, the system bandwidth, and/or the TDD configuration of the cell where the ICUE participating D2D broadcast communication is located.

Because the D2D communication of 3GPP is mainly for low-speed terminal and V2X business which has a lower requirement on time-delay sensitivity and receiving reliability, so the achieved D2D functions implemented may not meet the needs of users. In the subsequent 3GPP versions, to enhance the functional framework of D2D further is a broad consensus among the communication terminal manufacturers and communication network device manufacturers. Wherein, based on the D2D broadcast communication mechanism, the low time delay and high reliability communications between two high speed devices, between a low speed device and a high speed device, between a high speed device and a static device should be supported. That is V2X (Vehicle to Vehicle/Pedestrian/Infrastructure/Network) is one of the functions that need to be standardized first.

In V2X systems, the collision problems and leak in band problem may be solved based on sensing. A basic assumption here is that the occupancy resources of device is semi persistent scheduling (SPS), that is, the resources occupied by the device are periodic over a period of time. An device may detect the resources in the resource pool in two ways, one is based on decoding of PSCCH to obtain accurate information of occupied channel of the other devices, so the received power of corresponding device can be measured; the other is based on sensing the received energy of a resource of PSSCH resource pool. By combining the two methods above, the device may avoid to occupy the same resources with other devices to transmit data as much as possible. As shown in FIG. 1, record that the time of selecting PSCCH/PSSCH resources by the device is recorded as subframe n, the device should detect resources in the resource pool in the period of time from subframe n−a to subframe n−b firstly, to determine which time-frequency resources are occupied and which time-frequency resources are idle; And then the device may select PSCCH/PSSCH resources in subframe n. If the PSCCH is transmitted in subframe n+c, the PSSCH is transmitted in subframe n+d, and resource reserved is in the subframe n+e, the device may transmit the PSCCH in subframe n+c, transmit the PSSCH in subframe n+d, and transmit subsequent data on the resources reserved in subframe n+e. In particular, when c equals to d, the PSCCH and the PSSCH are located in the same subframe. In the implementation of the resource reselection, the device may select K resources in different subframes, that is a group of data may be transmitted sent K times, wherein, K is greater than or equal to 1, for example, K equals to 2, so as to avoid the problem that some devices may not receive the group of data because of the restrictions of this half duplex operation. When K is greater than 1, each PSSCH may indicate all the K resources above.

In V2X systems, two structures may be used to configure the PSCCH resource pool and the PSSCH resource pool. The PSCCH may be located in the same subframe as one of the PSSCH scheduled by the PSCCH. Or, the PSCCH should not locate in the same subframe as any one of the PSSCH scheduled by the PSCCH. The PSCCH resource pool and the PSSCH resource pool occupies the same subframe collection. A PSCCH is mapped to 2 PRBs fixedly.

When PSCCH and PSSCH are located in the same subframe, the PSCCH and PSSCH may occupy continuous PRBs. Now, the allocation granularity of frequency resource is a subchannel, a subchannel contains continuous PRBs, of which the PRB number is configured by high layer signaling. A device may occupy one or more continuous subchannels, wherein, two PRBs are used to carry PSSCH, for example, two PRBs with the lowest frequency are used to carry the PSCCH, while the other PRBs are used to carry the PSSCH. The actual number of PRBs occupied by PSSCH also needs to be the power of 2, 3 and 5. When the PSCCH and PSSCH are located at the same subframe, the PRBs of the PSCCH and the PRBs of the PSSCH may also be discontinuous. At this point, the location of an initial PRB of the PSCCH resource pool and that of the PSSCH resource pool may be configured respectively. The PSSCH resource pool still allocates resources as subchannel granular sizes. For a device, the index of PSCCH occupied by the device equals to the minimum among indexes of subchannel of the PSSCH occupied by the device.

DISCLOSURE OF INVENTION

Technical Problem

At present, 3GPP has basically completed the design of the PSSCH and the resource pool structure located in the same subframe with a PSSCH scheduled by it. When the PSCCH and any one of PSSCHs scheduled by it are not located in the same subframe, how to support V2X function effectively is an urgent problem to be solved.

Solution to Problem

Embodiments of the present disclosure may provide methods and devices for performing LBT and transmitting signals on a UFB, which may be applied to high-frequency-band signal transmission and LBT and avoid interference with other nodes on the UFB.

In order to achieve the above objectives, the present disclosure may adopt following schemes.

A method for transmitting signals on an Unlicensed Frequency Band (UFB) includes:

performing, by a transmitting node, a first type of Listen Before Talk (LBT) on a direction i;

transmitting, by the transmitting node, signals on a direction j after passing the first type of LBT, wherein the direction i is omnidirectional, or one or multiple beam directions corresponding to the direction j.

Preferably, the multiple beam directions are a predefined beam direction group, or the multiple beam directions are a set of multiple beam directions, which refer to the direction j and at least include the direction j.

Preferably, when the transmitting node successively transmits signals of multiple directions in one transmission burst, performing the first type of LBT on the direction i includes:

performing the first type of LBT on the direction i corresponding to each direction j in the multiple directions; or performing, by the transmitting node, omnidirectional first type of LBT.

Preferably, when the transmitting node transmits signals of multiple directions, performing the first type of LBT on the direction i includes:

performing the first type of LBT on the direction i corresponding to each direction j in the multiple directions, or performing, by the transmitting node, omnidirectional first type of LBT;

the method further includes:

with regard to a first direction, which is not directly used to transmit a signal after passing the first type of LBT, performing, by the transmitting node, a second type of LBT of the first direction before transmitting the signal on the first direction, and transmitting the signal on the first direction after the second type of LBT succeeds; or with regard to a second direction, which is not directly used to transmit the signal after passing the first type of LBT, when signal transmission begins in a first preset time period after the passing the first type of LBT, performing the second type of LBT on the corresponding second direction before the signal transmission begins, and transmitting the signal on the corresponding second direction after passing the second type of LBT;

time needed for performing the second type of LBT is shorter than that needed for performing the first type of LBT.

Preferably, when the transmitting node simultaneously performs the first type of LBT on multiple corresponding directions i, the method further includes:

with regard to a beam direction k, which first passes the first type of LBT, in the multiple corresponding directions i, performing a third type of LBT on the direction k in a preset time period before other beam directions finish the first type of LBT, and transmitting the signals on the direction j corresponding to the direction k after passing the third type of LBT on the direction k; wherein time used for performing the third type of LBT is shorter than that used for performing the first type of LBT; or adopting a same contention window (CWS) for multiple corresponding directions i, for which the first type of LBT is simultaneously performed; or adopting a same random back-off counter for multiple corresponding directions i, for which the first type of LBT is simultaneously performed; or generating a respective random back-off counter on each of multiple directions i, for which the first type of LBT is simultaneously performed.

Preferably, the transmitting node is an eNB, transmitting the signals on the direction j includes: transmitting a Discovery Reference Signal (DRS) on the direction j.

Preferably, when the eNB transmits the DRS, the eNB transmits the DRS of each direction in a Discovery Measurement Timing Configuration (DMTC) window, a transmitting position of the DRS of the each direction in the DMTC is fixed.

Preferably, when the LBT performed by the eNB is omnidirectional LBT, performing, by the transmitting node, the first type of LBT on the direction i includes: performing, by the eNB, the omnidirectional LBT before a starting point of a first DRS in the DMTC window; transmitting, by the transmitting node, the signals on the direction j after passing the first type of LBT includes: in the DMTC window, not transmitting the DRS before passing the LBT, transmitting the DRS of a corresponding direction from a transmitting position of a first DRS behind a position, which has passed the omnidirectional LBT, and successively transmitting the rest of DRSs in the DMTC; and/or when the LBT performed by the eNB is directional LBT, performing, by the transmitting node, the first type of LBT on the direction i includes: performing, by the eNB, the LBT of a corresponding direction before a transmitting position of each DRS in the DMTC, not transmitting the DRS of the corresponding direction when the LBT is not passed, and transmitting the DRS of the corresponding direction after passing the LBT.

Preferably, when the eNB transmits the DRS, the eNB transmits the DRS of each direction in the DMTC window, a transmitting sequence of the DRS of the each direction in the DMTC window is fixed and a starting position of the DRS of the each direction in the DMTC is not fixed.

Preferably, when the LBT performed by the eNB is omnidirectional LBT, performing, by the transmitting node, the first type of LBT on the direction i includes: performing, by the eNB, the LBT before a possible starting point of a first DRS in the DMTC, performing the LBT before a next possible starting point of the first DRS when the LBT is not passed, until the LBT is passed; transmitting the signals on the direction j after passing the first type of LBT includes: in the DMTC window, when the LBT is passed, transmitting a DRS of a first direction from a possible starting point of a first DRS after passing the LBT, and successively transmitting DRSs of all directions in the DMTC window; and/or when the LBT performed by the eNB is directional LBT, performing, by the transmitting node, the first type of LBT on the direction i includes: in the DMTC window, performing LBT of the each direction in turn according a transmitting sequence of the DRS of each direction; wherein performing, by the eNB, the LBT of the each direction includes: performing the LBT before a possible starting point of the DRS of the each direction, performing the LBT before a next possible starting point of the DRS of this direction when the LBT is not passed, until the LBT is passed; wherein transmitting, by the transmitting node, the signals on the direction j after passing the first type of LBT includes: when the LBT of one direction is passed, transmitting, by the eNB, the DRS of the direction from a possible starting position of the first DRS of the corresponding direction after passing the LBT.

Preferably, when the eNB transmits the DRS, the eNB transmits the DRS of each direction in the DMTC window; when a transmitting sequence and starting position of the DRS of the each direction in the DMTC is not fixed, direction information of a DRS is carried when the DRS is transmitted.

Preferably, when the eNB is able to simultaneously perform the LBT on multiple directions, transmitting, by the eNB, the DRSs on directions, which pass the LBT, includes: simultaneously transmitting the DRSs on the multiple directions, which pass the LBT.

Preferably, the eNB presets number of directional DRSs, and/or the eNB independently sets a transmitting period for a DRS of a different direction.

Preferably, signals transmitted on multiple directions are beam measurement signals;

when the beam measurement signals are transmitted together with data signals, the first type of LBT used for transmitting data is adopted;

when only the beam measurement signals are transmitted, time used for performing the first type of LBT is shorter than that used for performing the LBT adopted by the transmission of the data.

A method for performing Listen Before Talk (LBT) on an Unlicensed Frequency Band (UFB), includes:

determining, by a transmitting node, a reference sub-frame used for LBT of a current sub-frame according to a transmitting direction of the current sub-frame;

adjusting, by the transmitting node, a contention window (CWS) of the LBT of the current sub-frame according to a statistical result of Acknowledgement/Negative-Acknowledgement (ACK/NACK) information of the reference sub-frame, and performing the LBT for the current sub-frame.

Preferably, the reference sub-frame determined according to the transmitting direction includes: a first sub-frame, in which the transmitting node has received ACK/NACK information and a designated transmission burst is transmitted on a direction j' corresponding to a transmitting direction i'; the designated transmission burst is a transmission burst, which is closest to the current sub-frame and includes the signal of the direction j' and the direction j' is one or multiple beam directions corresponding to the direction i'; and/or when the current sub-frame has multiple transmitting directions, the reference sub-frame determined according to the transmitting directions includes: a sub-frame, in which the transmitting node has received the ACK/NACK information and the sub-frame includes at least one of the multiple transmitting directions.

Preferably, the multiple beam directions are a predefined beam direction group, or the multiple beam directions are a set of multiple beam directions, which refer to one of the multiple beam directions and at least include the beam direction, which is taken as a reference beam direction.

Preferably, adjusting the CWS of the LBT of the current sub-frame includes: making statistics on ACK/NACK information transmitted on the direction j' in the reference sub-frame, and adjusting the CWS according to the statistical result.

Preferably, before determining the reference sub-frame, the method includes:

receiving a high layer configuration, performing the processing of the reference sub-frame when the high layer configuration determines the reference sub-frame and makes statistics on the ACK/NACK information according to the transmitting direction; otherwise, terminating this flow.

A method for performing Listen Before Talk (LBT) on an Unlicensed Frequency Band (UFB), includes:

determining, by a first transmitting node, a Listen Before Talk (LBT) type indication, which is to be transmitted to a second transmitting node, according to a direction used by the first transmitting node for transmitting signals, and/or a direction of LBT, and a direction used by the second transmitting node for transmitting signals, transmitting the LBT type indication, with which the second transmitting node performs the LBT on the UFB.

Preferably, determining the LBT type indication according to the direction used by the first transmitting node for transmitting the signals, and the direction used by the scheduled second transmitting node for transmitting the signals includes:

when a direction m used by the first transmitting node for transmitting the signals corresponds to a direction n used by the second transmitting node for transmitting the signals and signal transmission of the second transmitting node is performed in a Max Channel Occupancy Time (MCOT), the LBT type indication is an indication indicating performing 25 us LBT; otherwise, the LBT type indication is an indication indicating performing Cat-4 LBT, the direction n is a single beam direction which corresponds to the direction m, or the direction n is one of multiple beam directions corresponding to the direction m.

Preferably, determining the LBT type indication according to the direction of the LBT performed by the first transmitting node and the direction used by the scheduled second transmitting node for transmitting signals includes:

when the first transmitting node performs omnidirectional LBT before transmitting signals and signal transmission of the second transmitting node is performed in the MCOT, or when a direction m' of LBT performed by the first transmitting node before transmitting the signals corresponds to a direction n used by the second transmitting node for transmitting the signals and the signal transmission of the second transmitting node is in the MCOT, the LBT type indication is an indication for performing 25 us LBT; otherwise, the LBT type indication is an indication for performing Cat-4 LBT, the direction n is a single beam direction which corresponds to the direction m', or the direction n is one of multiple beam directions corresponding to the direction m'.

Preferably, when the first transmitting node is an eNB and a second transmitting node is a UE, transmitting the LBT type indication includes:

the LBT type indication is borne by Uplink (UL) grant, which is used to schedule the UE, or is borne by Downlink (DL) cell common signaling.

Preferably, when the LBT type indication is borne by the cell common signaling, the cell common signaling carries information of the direction used by the first transmitting node for transmitting the signals or information of the direction of the LBT performed before the first transmitting node transmits the signals.

A device for transmitting signals on an Unlicensed Frequency Band (UFB), includes: a Listen Before Talk (LBT) unit and a signal transmitting unit; wherein the LBT unit, is to perform a first type of LBT on a direction i, and send a notification to the signal transmitting unit after passing the first type of LBT, the signal transmitting unit, is to transmit signals on a direction j after receiving the notification from the LBT unit, wherein the direction i is omnidirectional, or one or multiple beam directions corresponding to the direction j.

A device for detecting carriers on an Unlicensed Frequency Band (UFB), includes: a reference sub-frame determining unit and a Listen Before Talk (LBT) unit; wherein the a reference sub-frame determining unit is to determine a reference sub-frame used for LBT of a current sub-frame according to a transmitting direction of the current sub-frame;

the LBT unit is to adjust a contention window (CWS) of the LBT of the current sub-frame according to a statistical result of Acknowledgement/Negative-Acknowledgement (ACK/NACK) information of the reference sub-frame, and perform LBT for the current sub-frame.

A first transmitting node device on an Unlicensed Frequency Band (UFB), wherein the device includes: a Listen Before Talk (LBT) type indication determining unit, and an LBT type indication transmitting unit; wherein the LBT type indication determining unit is to determine an LBT type indication, which is to be transmitted to a second transmitting node, according to a direction used by the first transmitting node for transmitting signals, and/or a direction of LBT, and a direction used by the scheduled second transmitting node for transmitting signals, and the LBT type indication transmitting unit, is to transmit the LBT type indication, with which the second transmitting node performs the LBT on the UFB.

The present application provides a method for transmitting control signaling and data, comprising:

Performing, by an UE, a resource selection and reselection to select resources for transmitting a scheduling assignment (SA), signaling and data channels;

transmitting, by the UE, the SA to indicate the resources for transmitting the data channels; and transmitting, by the UE, corresponding data.

Preferably, for different scheduling types, the number of bits contained by SAs is the same; wherein, the scheduling type includes:

scheduling type 1: the SA and a data channel scheduled by the SA are located in the same subframe;

scheduling type 2: the SA and any one of data channels scheduled by the SA are not located in the same subframe; and scheduling type 3: the SA and a data channel scheduled by the SA are located in the same subframe, or, the SA and any one of data channels scheduled by the SA are not located in the same subframe.

Preferably, as for the scheduling type 1, the UE indicates at least one piece of the information below in the reserved bits of the SA:

information that distinguisher the scheduling type 1 from other scheduling types;

information of subframe gap between the SA and the data channel scheduled by the SA;

information of a starting subchannel occupied by the data channel scheduled by the SA.

Preferably, transmitting, by the UE, the SA to indicate the resources for transmitting the data channels selected comprises: at least two SAs for scheduling the same data transmitted by the UE indicate the same data channel resource directly Preferably, transmitting, by the UE, the SA to indicate the resources for transmitting the data channels selected comprises:

for a resource pool, configuring a scheduling type adopted by a vehicle type UE (VUE) and configuring a scheduling type adopted by a pedestrian type UE (PUE); or being independent from a resource pool configuration, configuring that the SA of the PUE and a data channel scheduled by the SA are located in the same subframe; or for a resource pool, configuring that the SA and a data channel scheduled by the SA are located in the same subframe, or the SA and any one of data channels scheduled by the SA are not located in the same subframe.

Preferably, transmitting, by the UE, the SA to indicate the resources for transmitting data channels selected comprises: for a resource pool, configuring the range of the subframe gap between the SA and a data channel scheduled by the SA.

Preferably, the performing, by the UE, a resource selection and reselection comprises:

maintaining the resources of the data channels currently selected and reselecting new resources for the SA with a probability p; and reselecting new resources for the SA and the data channels with a probability 1−p; or maintaining the resources of the SA and the data channels currently selected with a probability p1; maintaining the resources of the data channels currently selected and reselecting new resources for the SA with a probability p2; and reselecting new resources for the SA and the data channels with a probability 1−p1−p2.

Preferably, the performing, by the UE, a resource selection and reselection to select the resources for transmitting the SA and the data channels comprises:

selecting the resources for transmitting the data channels within a subframe of a selecting window, and selecting the resource for transmitting the SA within the subframe of the selecting window and other subframes.

Preferably, the performing resource selection and reselection, by the UE, comprises: when the PUE detects that the load exceeds the set threshold, the PUE increases the ratio of the actually detected subframes; or, selects the resource randomly within the selecting window.

Preferably, the performing, by the UE, a resource selection and reselection comprises:

determining the ratio of the number of resources of a resource collection in which a resource is randomly selected to the total number of resources of the selecting window according to the number of subframes within the selecting window; or configuring the ratio of the number of resources of a resource collection in which a resource is randomly selected to the total number of resources of the selecting window by a higher layer signaling; or configuring the ratio of the number of resources of a resource collection in which a resource is randomly selected to the total number of resources of the selecting window by a higher layer signaling for each resource pool respectively.

The present application provides a device for transmitting control signaling and data, comprising: a resource selection module and a transceiver module:

the resource selection module is to perform a resource selection or reselection to select resources for transmitting an SA and data channels; and the transceiver module is to receive an SA and data channels from other devices, and transmit the SA of its own to indicate the resources selected for transmitting the data channels and corresponding data according to the selection of the resource selection module.

Advantageous Effects of Invention

With the above technical scheme, in embodiments of the present disclosure, when the LBT is performed before transmitting the signals, the directional LBT may be performed, so that interference with other nodes on the UFB may be avoided and system gain may be improved.

By the technical scheme of the present disclosure, the performance of avoidance collision of the device based on SA is improved and the detection accuracy of the total received energy of the subband is improved, and resource selection/reselection is better to be supported, thereby collision and interference between the devices is avoided effectively.

BRIEF DESCRIPTION OF DRAWINGS

FIG. 1 is a diagram illustrating a network scenario, in which LFBs and UFBs connect with each other in a DC mode;

FIG. 2 is a flow chart illustrating a method in embodiment one of the present disclosure;

FIG. 3 is a first diagram illustrating LBT and signal transmission in the embodiment one;

FIG. 4 is a second diagram illustrating LBT and signal transmission in the embodiment one;

FIG. 5 is a diagram illustrating that an eNB simultaneously perform LBT on two beam directions in the embodiment one;

FIG. 6 is a first diagram illustrating determination of a reference sub-frame in an embodiment two;

FIG. 7 is a second diagram illustrating determination of a reference sub-frame in the embodiment two;

FIG. 8 is a third diagram illustrating determination of a reference sub-frame in the embodiment two;

FIG. 9 is a diagram illustrating that an eNB schedules a UE to transmit Uplink (UL) and Downlink (DL) service data in a third embodiment;

FIG. 10 is a first diagram illustrating transmission of Discovery Reference Signals (DRS)s in a fourth embodiment;

FIG. 11 is a second diagram illustrating transmission of DRSs in a fourth embodiment;

FIG. 12 is a first diagram illustrating possible starting positions of the DRSs in the fourth embodiment;

FIG. 13 is a second diagram illustrating possible starting positions of the DRSs in the fourth embodiment;

FIG. 14 is a third diagram illustrating possible starting positions of the DRSs in the fourth embodiment;

FIG. 15 is a fourth diagram illustrating transmission of DRSs in the fourth embodiment;

FIG. 16 is a diagram illustrating basic structure of a signal transmitting device corresponding to the embodiment one;

FIG. 17 is a diagram illustrating basic structure of an LBT device corresponding to the embodiment two;

FIG. 18 is a diagram illustrating basic structure of a first transmitting node device corresponding to the embodiment three;

FIG. 19 is a diagram illustrating basic structure of a second transmitting node device corresponding to the embodiment three; and FIG. 20 is a diagram illustrating basic structure of a signal transmitting device corresponding to the embodiment four;

FIG. 21 is a schematic diagram illustrating a PSCCH/PSSCH resource selection/reselection in the current V2X system;

FIG. 22 is a flow chart illustrating a method for transmitting control signaling and data;

FIG. 23 is timing schematic diagram 1 of SA and scheduled data channels in embodiment 2 of the present disclosure;

FIG. 24 is timing schematic diagram 2 of SA and scheduled data channels in embodiment 2 of the present disclosure;

FIG. 25 is a schematic diagram illustrating that the PUE only detects part of subframes in embodiment three of the present disclosure;

FIG. 26 is a schematic diagram illustrating that the PUE may not detect the received power in embodiment three of the present disclosure;

FIG. 27 is flow chart 1 of keeping an used SA and/or an data channel currently in embodiment five of the present disclosure;

FIG. 28 is flow chart 2 of keeping an used SA and/or an data channel currently in embodiment five of the present disclosure;

FIG. 29 is flow chart 3 of keeping an used SA and/or data channel currently in embodiment five of the present disclosure;

FIG. 30 is a flow chart illustrating performing the resource selection based on the sensing in embodiment seven of the present disclosure;

FIG. 31 is a schematic diagram illustrating a structure of an device for transmitting control signaling and data of the present disclosure.

MODE FOR THE INVENTION

The present invention will be described in detail hereinafter with reference to accompanying drawings and embodiments to make the objective, technical solutions and merits therein clearer.

Embodiment One

In this embodiment, before transmitting signals on the UFB, LBT may be performed according to the transmitting directions of the signals. Specifically, the signal transmission method in this embodiment may be shown in FIG. 2 and may following blocks.

At block 101, a transmitting node may perform a first type of LBT (the first type of CCA) for a direction i.

The direction i may be Omni direction or a fixed sector direction.

The Omni direction may be omnidirectional. The direction i may include one or multiple beam directions corresponding to the direction j, i.e. transmitting direction j, used for transmitting the signals. The multiple beam directions may be a predefined group of beam directions, or a set of multiple beam directions, which may refer to a beam direction and at least may include the beam direction. It may show that the LBT may be implemented via monitoring a receiving signal. Therefore, the beam direction in the LBT may be the direction for receiving the beam.

Preferably, the corresponding relationship between the direction i and direction j may be preset, or configured. Notice that as for a transmitting node, the number of received beams may be the same as, or different from the number of transmitted beams. For instance, the number of the received beams may be less than that of the transmitted beams and bandwidth of each received beam may be much broader. For instance, the received beam of the direction i may correspond to the transmitted beam of the direction j, i.e., the directions may completely correspond to each other. For another instance, the number of received beams may be 4, while the number of transmitted beams may be 16. Therefore, one received beam may correspond to four transmitted beams. Therefore, the received beams of the direction i may include the transmitted beam of the direction j.

For instance, an eNB as a transmitting node may support beams of 16 directions. Relationship among the direction i, sixteen beam directions and the direction j may be that: (1) the direction i may be one of the 16 beam directions. (2) The direction i may be that corresponding to one of N beam groups. For instance, the 16 beams may be equally divided into N groups, such as N=4, therefore, the first to fourth beams may be allocated to a first group, the fifth to eighth beams may be allocated to a second group, and so on. The direction i may be the direction of one of the N groups of beams. This group of beams may include a beam of the direction j. (3) The direction i may also be the direction of a beam group formed by M adjacent beams including the beam of the direction j. M is predefined or configured. For instance, suppose that each received beam group may include three beams, the direction i may be the direction corresponding to the beam group formed by beams of the direction (j−1), direction j and direction (j+1).

Preferably, as for the above situation (2) and situation (3), the transmitting node may perform the CCA detection on the combined direction i corresponding to the beam groups. For instance, if the bandwidth of a transmitted beam is 20 degrees, it may be predefined or configured that four received beams may be allocated to one group, therefore, the bandwidth of the received beams may be 80 degrees, and the transmitting node may perform the CCA detection on the direction i of the 80 degrees. The transmitting node may perform the CCA detection on multiple smaller combined directions i corresponding to the beam groups. For instance, when the width of the transmitted beam is 20 degrees, it may be predefined or configured that four received beams may be allocated to one group, while the width of the received beam may be 40 degrees. In order to perform the CCA detection on the direction i of 80 degrees, the transmitting node may respectively perform the CCA detection on two directions i of the 40 degrees.

Further, the direction i may correspond to the direction j. In some scenarios, the direction j of a signal may be first determined, and the direction i of the LBT may be then determined according to the direction j. In some scenarios, the direction i of the LBT may be first determined, the direction j of the signal may be determined according to the direction i of the LBT, then the signal may be transmitted on this direction. In the following description, the direction i may be called an LBT direction, and the direction j may be called a signal transmitting direction.

At block 102, when first type of LBT of the direction i passes, the transmitting node may begin to transmit signals on the corresponding direction j.

The first type of LBT in this embodiment may be a predefined LBT mode. Preferably, the first type of LBT may be Category-4 LBT in the existing LAA system. Refer to the description in chapter 15 of TS 36.213.

Preferable, after the transmitting node finishes the first type of LBT on the direction i, the transmitting node may immediately begin to transmit the signals on the direction j corresponding to the direction i. The corresponding relationship between the direction i and the direction j may be described in block 101.

In this embodiment, the transmitting node may be an eNB, or may be a terminal device. In the following description, the transmitting node may be configured as the eNB.

Preferably, when the transmitting node needs to continuously transmit signals of multiple directions in a transmission burst (such as a DL burst), the transmitting node at least may need to pass the first type of LBT on LBT directions i respectfully corresponding to the multiple transmitting directions. Signals may be transmitted on the transmitting directions, which have passed the LBT, in the DL burst. For instance, the Max Channel Occupancy Time (MCOT)=4 ms, the eNB may transmit the DL data of direction 1 in a first and second sub-frames, and transmit the DL data of direction 2 in a third and fourth sub-frames. Therefore, the eNB may transmit the first to fourth sub-frames after finishing the first type of LBTs i respectively corresponding to the direction 1 and direction 2 in the first sub-frame. The eNB may not need to further perform the first type of or other LBT in the four sub-frames. When the LBTs i of the direction 1 and direction 2 are overlapped with each other, the LBT may only need to be performed once on the overlapped direction.

In an alternative, preferably, when the transmitting node needs to continuously transmit signals of multiple directions in a transmission burst (such as a DL burst), the transmitting node may finish an omnidirectional first type of LBT, i.e. the first type of LBT on all directions. The signal may be transmitted on the transmitting direction corresponding to the direction that has passed the LBT.

Preferably, when the transmitting node needs to transmit signals of multiple directions in a transmission burst (such as a DL burst), the transmitting node may need to finish the first type of LBT of LBT directions i corresponding to directions of all to-be-transmitted signals. Regard to a direction, on which a signal may not be immediately transmitted after the first type of LBT is finished, when the transmitting node transmits the signal of this direction after a period of time, a second type of LBT may be needed to be performed on the LBT direction i corresponding to this direction. When the second type of LBT succeeds, the signal may be immediately transmitted on this direction. Time limit may be set for performing of the second type of LBT, that is, when the signal is transmitted in a preset time period after passing the first type of LBT, the second type of LBT may be performed. The first type of LBT needs to be performed again when a signal is transmitted after the preset time period. In an alternative, no time limit is set for the performing of the second type of LBT, as long as a corresponding detection direction passes the first type of LBT, the second type of LBT may be performed no matter when the signal transmission is performed, and the signal may be transmitted after passing the second type of LBT. The second type of LBT may be a predefined type of LBT mode that may differ from the first type of LBT. The speed of second type of LBT may be faster than that of the first type of LBT. For instance, the second type of LBT may perform the LBT in only one time unit Td. When a channel is idle in partial time or all time of the time unit Td, the second type of LBT is considered to be successful.

Preferably, the time unit Td may include a fixed time Tf and m successive detection slots Ts.

For instance, Tf=16 us, and Ts=9 us, m may be related to a service type. Here, m may be the same as that used in the first type of LBT.

Preferably, m=1. For instance, the time unit Td may be 25 us, i.e., Tf+Ts.

For instance, MCOT=6 ms, the eNB may need to transmit DL data of the direction 1 in n-th to (n+3)th sub-frames, and transmit the DL data of the direction 2 in the (n+4)th and (n+5)th sub-frames. Suppose that the eNB may have finished the first type of LBT on the LBT directions i corresponding to the direction 1 and the direction 2, the eNB may immediately transmit the DL data of the direction 1 in the n-th to (n+3)th sub-frames. Before transmitting the DL data of the direction 2 in the (n+4)th and (n+5)th sub-frames, the eNB may further need to perform the second type of LBT on the LBT direction corresponding to the direction 2. When the second type of LBT succeeds, the eNB may transmit the DL data of the direction 2 in the (n+4)th and (n+5)th sub-frames; When the second type of LBT does not succeed, the eNB cannot transmit the DL data of the direction 2 in the (n+4)th and (n+5)th sub-frames, as shown in FIG. 3.

For another instance, the eNB may perform the first type of LBT on LBT directions corresponding to the beam direction 1 and beam direction 2, and successfully pass the LBT of the LBT directions corresponding to the two beam directions. The eNB may immediately begin to perform DL transmission for the UE1 on the beam direction 1 and successively transmit signals in the n-th to (n+3)th sub-frames. Then, the eNB may perform the DL transmission, such as transmit C-Physical Downlink Control Channel (PDCCH), for the UE1 and the UE2 respectively on the beam direction 1 and the beam direction 2 in the (n+4)th sub-frame. Since the eNB has finished the Cat-4 LBT of the beam direction 2 before beginning to perform the transmission, the before the eNB begins to transmit the signal on the beam direction 2 in the (n+4)th sub-frame, the eNB may only need to perform fast LBT on the LBT direction corresponding to the beam direction 2 in the time unit Td. When the channel is idle, the eNB may begin to transmit the signal on the beam direction 2. Since the LBT has been performed in the (n+4)th sub-frame, the signal transmission of the beam direction 1 may be paused. However, since the eNB transmits consecutive DL signals on the beam direction 1 in the n-th to (n+3)th sub-frames and transmits successive DL Signals on the beam direction 1, the eNB may not transmit all DL signals of the UE1, and DL sub-frames, which may be continuously transmitted, may not exceed the MCOT. Therefore, the eNB may perform the fast LBT on the LBT direction corresponding to the beam direction 1. When the channel is idle, the eNB may continue to transmit signals on the beam direction 1, as shown in FIG. 4.

In an alternative, preferably, when the transmitting node needs to transmit signals of multiple directions in one transmission burst (such as a DL burst), the transmitting node may perform an omnidirectional first type of LBT, i.e. the first type of LBT on all directions. When the signal transmission is not performed immediately after finishing the first type of LBT and the transmitting node transmits signals of directions in the multiple directions after a period of time, the transmitting node may need to perform the omnidirectional second type of LBT or the perform the second type of LBT of the LBT directions corresponding to the transmitting directions before performing the transmission.

Preferably, when the transmitting node needs to perform the first type of LBT on multiple beam directions, the transmitting node may perform the first type of LBT on the corresponding beam directions in a time-division mode. For instance, in the above instance, the eNB may perform the LBT for the LBT direction corresponding to the beam direction 2 first, and then perform the LBT on the LBT direction corresponding to the beam direction 1. When the transmitting node has multiple antenna arrays, the transmitting node may simultaneously perform the LBT on multiple beam directions. As shown in FIG. 5, as the transmitting node, the eNB may support two antenna arrays, that is, at the same time, two sets of Radio Frequency (RF) branches may simultaneously work, for instance, the LBT may be performed on two beam directions.

Preferably, when the transmitting node simultaneously performs the LBT on multiple beam directions, it should be avoided that the transmission channel corresponding to the beam direction, LBT of which has been finished, affects the LBT of a beam direction, LBT of which is being performed. Therefore, the beam direction i, LBT of which has been finished, may wait for a period of time and perform the third type of LBT on the beam direction i just before the LBT of other beam directions k is scheduled to be finished. When the third type of LBT succeeds, the signal may be transmitted on the signal direction j corresponding to the beam direction i. Therefore, the LBT of the multiple beam directions may end at the same time and the signals may be transmitted at the same time. The third type of LBT may be a predefined type of LBT mode that may differ from the first type of LBT. The speed of the third type of LBT may be faster than that of the first type of LBT. For instance, when a channel is idle in the time unit Td, the third type of LBT may be considered to be successful. In practice, the third type of LBT may be the same as the second type of LBT, or different from the second type of LBT.

Multiple beam directions, on which the LBT may be simultaneously performed, may adopt a same CWS, such as the maximum CWS in all the beam directions, on which the LBT may be simultaneously performed.

The CWS of each of the multiple beam directions, on which the LBT may be simultaneously performed, may be selected according to LBT priority types of the beam directions.

A same random back-off counter may be applied to the multiple beam directions, on which the LBT may be simultaneously performed.

A random back-off counter may be respectively generated for each of the multiple beam directions, on which the LBT may be simultaneously performed.

Preferably, the transmitting node in the embodiments may be the eNB or a terminal device.

Embodiment Two

In the existing LAA system, when performing the LBT, the eNB may need to adjust CWS. When adjusting the CWS, the eNB may need to determine a reference sub-frame, and adjust the CWS according to a statistical result of ACK/NACK information of the reference sub-frame. In high frequency communication, since the DL transmission is based on the beam, different beam directions may reflect different geographical positions to some extent. Usually, UEs with different beam directions may be far away from each other and may be interfered with different interference sources. Therefore, by adjusting the CWS according to the ACK/NACK information of the corresponding beam direction, the impact of the interference with a beam direction on next transmission of this beam direction may be accordingly changed.

However, as described above, in the existing LAA system, the statistical result of the ACK/NACK of the reference sub-frame may be determined without according to a position relationship of the UEs.

In this embodiment, the CWS may be adjusted according to the statistical result of the ACK/NACK information of the corresponding beam direction. Specifically, in this embodiment, the method for performing the LBT on a UFB may include:

At block 201, regard to a current sub-frame, on which the LBT may need to be performed, a transmitting node may determine a reference sub-frame according to a transmitting direction of the current sub-frame.

The transmitting node may determine a reference sub-frame k according to a transmitting direction i' of the current to-be-transmitted sub-frame.

Specifically, the sub-frame k may be a first sub-frame that may be transmitted on the direction j' corresponding to the transmission i' in a designated transmission burst, and the transmitting node may have obtained the ACK/NACK information of the sub-frame. The designated transmission burst may be the one that may be closest to the current sub-frame and include the signal of the direction j'. The relationship between the direction j' and the direction i' may be: the direction j'=the direction i', that is, the corresponding relationship between the beam transmitting direction of the reference sub-frame and the transmitting direction of the current to-be-transmitted burst is a single beam direction corresponding relationship. In an alternative, the direction j' may include the direction i', that is, multiple beam transmitting directions may be set for the reference sub-frame, the multiple beam directions may form a beam group, and the beam group may correspond to the transmitting direction of the current to-be-transmitted burst. That is, the direction j' may be a single beam direction or multiple beam directions corresponding to the direction i'.

Preferably, the direction j' may include the direction i', the grouping mode of the beam group in block 101 may be adopted, for instance, all directions in the beam group, which may include the direction i', may be the directions j'. For instance, 16 directions may be divided into 4 groups. The first to fourth beams may be divided into a first group, the fifth to eighth beams may be divided into a second group, and so on. Suppose that the direction i' may be the fifth beam, the directions j' may include directions of the fifth to eighth beams. That is, when the sub-frame k includes the transmission signal of at least one direction in the fifth to eighth beams, the sub-frame k may be the reference sub-frame. For another instance, suppose that the beam group may include three beams, the directions j' may include three directions, i.e. direction (i'−1), direction i' and direction (i'+1).

Preferably, when the directions of the sub-frames, that are currently to be transmitted by the transmitting node, include multiple directions, the reference sub-frame k may be the one that may include the transmission signal of at least one of the multiple directions.

For instance, as shown in FIG. 6, the eNB may adopt the beam direction 2 in the (N−1)th DL transmission burst, adopt the beam direction 1 in the N-th DL transmission burst and adopt the beam direction 2 in the (N+1)th DL transmission burst. The reference sub-frame of the CWS adopted by the LBT performed before the (N+1)th DL transmission burst may not be the first sub-frame of the N-th DL transmission burst, but be the first sub-frame of the (N−1)th DL transmission burst.

For another instance, as shown in FIG. 7, suppose that the (N−1)th DL burst may be transmitted on the beam direction 2, the N-th DL burst may be transmitted on the beam direction 1, and the (N+1)th DL burst may be transmitted on the beam direction 2 and the beam direction 3. Therefore, the first sub-frame of the (N−1)th DL burst may be the reference sub-frame of the (N+1)th DL burst on the beam direction 2 and beam direction 3 (the LBT before the (N+1)th DL burst may be an omnidirectional LBT, therefore, the beam direction 2 and the beam direction 3 may adopt a same LBT. In an alternative, the LBT before the (N+1)th DL burst may be a directional LBT, the LBT may be respectively performed on the beam direction 2 and beam direction 3, and the reference sub-frames of the LBT of the two directions may be the same sub-frame). In an alternative, the first sub-frame of the (N−1)th DL burst may only be the reference sub-frame of the (N+1)th DL burst on beam direction 2 (The LBT before the (N+1)th DL burst may be the directional LBT, the LBT may be respectively performed on the beam direction 2 and beam direction 3. The reference sub-frame of the LBT on the beam direction 2 may be the first sub-frame of the (N−1)th DL burst. The reference sub-frame of the LBT on the beam direction 3 may be the first sub-frame of a burst, which may be found in previous bursts and include the beam direction 3).

For another instance, as shown in FIG. 8, the eNB may adopt the beam direction 2 in the first four sub-frames in the N-th DL transmission burst, adopt the beam direction 1 in the last two sub-frames of the Nth DL transmission burst, while adopt the beam direction 1 in the (N+1)th DL transmission burst. Therefore, the reference sub-frame of the CWS adopted by the LBT performed before the (N+1)th DL transmission burst may not be the first sub-frame of the Nth DL transmission burst, but be the fifth sub-frame of the Nth DL transmission burst, i.e. the first sub-frame of the beam direction 1.

At block 202, the transmitting node may adjust the CWS of the LBT of the current sub-frame frame according to the statistical result of the ACK/NACK information of the reference sub-frame and may perform the LBT.

The ACK/NACK result of the reference sub-frame determined at block 201 may be calculated and the CWS of the LBT of the current sub-frame may be adjusted according to the statistical result.

Preferably, when the ACK/NACK information of the reference sub-frame is calculated and used to adjust the CWS, the ACK/NACK t information transmitted on the direction j' corresponding to the transmitting direction i' in the reference sub-frame may be calculated, while the ACK/NACK information transmitted on other directions may not be calculated. This direction j may be the single beam as described above, or the beam group as described above. For instance, when the principle corresponding to the single beam is adopted, the eNB may perform the DL transmission of the direction i and the DL transmission of the direction 1 in the reference sub-frame, the ACK/NACK result of the DL transmission of the direction i may only be calculated. For another instance, when the principle corresponding to the beam group is adopted, the eNB may perform the DL transmission of the direction i and the DL transmission of the direction 1, which may be in the same beam group as the direction i', in the reference sub-frame, the ACK/NACK results of the DL transmission of both the direction l' and direction 1 may be calculated. In an alternative, the eNB may only perform the DL transmission of the direction 1 in the reference sub-frame, the direction 1 and the direction i may be in the same beam group, the ACK/NACK result of the DL transmission of the direction 1 may be calculated.

For another instance, the eNB may support beams of 16 directions. The beam direction 2 and beam direction 8 may be adopted in the Nth DL transmission burst for transmitting signals for UE1 and UE2. The beam direction 8 and the beam direction 2 may not be in a same beam group. The eNB may adopt the beam direction 2 in the (N+1)th DL transmission for transmitting signals for the UE3. Therefore, the reference sub-frame of the CWS adopted by the LBT performed before the (N+1)th DL transmission burst may be the first sub-frame of the Nth DL transmission burst, and the calculated ACK/NACK information may only include that of the UE1. When the total number of NACK exceeds 80%, the value of the CWS may be enlarged to that of the next CWS; otherwise, the value of the CWS may be reconfigured.

For another instance, the eNB may adopt the beam direction 2 and beam direction 8 in the Nth DL transmission burst for transmitting signals for UE2 and UE3. The beam direction 2 and the beam direction 3 may be in a same beam group, that is, the beam direction 3 may be a reference beam direction of the beam direction 2. The eNB may adopt the beam direction 2 in the (N+1)th DL transmission. Therefore, the reference sub-frame of the CWS adopted by the LBT performed before the (N+1)th DL transmission burst may be the first sub-frame of the Nth DL transmission burst, and the calculated ACK/NACK information may include those of the UE2 and UE3. When the total number of NACK exceeds 80%, the value of the CWS may be enlarged to that of the next CWS; otherwise, the value of the CWS may be reconfigured.

In view of the above, the method adopted in this embodiment may determine the reference sub-frame according to the transmitting direction. Taking flexibility of the configuration into consideration, the mode for determining the reference sub-frame using high layer configuration may be adopted. When the high layer configuration determines the reference sub-frame and calculate the ACK/NACK information according to the transmitting direction, the LBT may be performed using the methods in the above blocks 201 and 202; otherwise, the above method may not be adopted.

For instance, the method in the existing LAA system may be adopted to determine the reference sub-frame and calculate the ACK/NACK.

Preferably, the method in the existing LAA system may be adopted to adjust the CWS according to the calculated ACK/NACK result, refer to TS 36.213 15.1.3 and 15.2.2.

Preferably, in the embodiment, the transmitting direction of the reference sub-frame may be limited, while whether the LBT is directional or omnidirectional may not be limited, either is applicable.

Preferably, the transmitting node in this embodiment may be an eNB or a terminal device.

Embodiment Three

In the existing LAA system, after an eNB occupies a channel via Cat-4 LBT, when the total time length of DL sub-frames successively transmitted by the eNB and UL sub-frames scheduled by the eNB does not exceed the MCOT, the UL sub-frames may adopt 25 us LBT to quickly transmit the signals. This mode may be called UL and DL shared MCOT. In the conventional method, the eNB may indicate the 25 us LBT via two modes. The first one is using the LBT type indication in an UL grant. The other one is using C-PDCCH to indicate which sub-frames are in the MCOT and which sub-frames are not in the MCOT. When the user performs the LBT in a sub-frame in the MCOT, the 25 us LBT may be adopted; otherwise, the Cat-4 LBT may be adopted. When the LBT type indicated by the UL grant, which may be previously received by the UE, is Cat-4, while the UE then receives the C-PDCCH and the sub-frame, for which the LBT is to be performed, may be in the MCOT, the UE may perform 25 us LBT. In the C-PDCCH, an indication indicating that no sub-frame belongs to the MCOT may be configured. Therefore, the UE may be instructed to perform the LBT using the LBT type indicated by the UL grant. In an embodiment of the present disclosure, the LBT may be omnidirectional. Although the DL transmission may be directional as pre-coded, the DL transmission may also include signals, which may be transmitted in an omnidirectional mode. Therefore, once the eNB may succeed in transmitting signal using the Cat-4 LBT, the eNB may assist the UE in occupying the channel more or less. The UE may rapidly occupy the channel via the faster LBT and continue to perform transmission in the MCOT.

However, in the high-frequency UFB, as described above, the LBT may be directional and the signals transmitted may be directional. When the eNB occupies the channel via Cat-4 LBT of direction m, the direction n and direction m of UL transmission of the UE, which may be scheduled in the MCOT, may be two totally different directions. Therefore, when the UE still may rapidly occupy the channel using the 25 us LBT, the UE may interfere with other nodes, or may occupy the channel with a much radical mode. Therefore, the LBT method in this embodiment may provide that when the transmitting direction of the eNB corresponds to that of the UE, the UE may share the MCOT with the eNB.

In this embodiment, the LBT performed on the UFB may include:

At block 301, a first transmitting node may determine an LBT type indication, which may be to be transmitted to a second transmitting node and used to instruct the second transmitting node to perform the LBT, according to a direction used by the first transmitting node for transmitting signals, and/or a direction of LBT, and a direction used by the second transmitting node for transmitting signals.

Preferably, the transmitting node in this embodiment may be the eNB or the terminal device. In a more common situation, the first transmitting node may be the eNB and the second transmitting node may be the UE. Description may be given hereinafter taking this situation for example.

Preferably, the eNB may determine the LBT type indication transmitted to the second transmitting node according to the direction used for transmitting the DL signal and the direction used by the scheduled UE for transmitting the UL signal, and instruct the UE to perform the LBT according to the LBT type indication.

For instance, if the transmitting direction m of the DL signal corresponds to the transmitting direction n of the UL signal of the UE, and the scheduled UL transmission of the UE is in the MCOT, the eNB may indicate the UE to perform 25 us LBT; otherwise, the eNB may indicate the UE to perform the Cat-4 LBT. Refer to the corresponding relationship of the direction i and the direction j in the embodiment one or the corresponding relationship between the direction j' and the direction l' in the embodiment two for the corresponding relationship between the direction m and the direction n.

In an alternative, preferably, the eNB may determine the LBT type indication sent to the second transmitting node according to the direction of the LBT before the DL signal is transmitted and the direction used by the scheduled UE for transmitting the UL signal.

For instance, if the omnidirectional LBT is performed before the DL signal is transmitted, and the UL transmission of the scheduled UE is in the MCOT, the eNB may indicate the UE to perform the 25 us LBT; otherwise, the eNB may indicate the UE to perform the Cat-4 LBT.

Preferably, if the eNB sends the indication of the 25 us LBT, the eNB may need to finish the DL Cat-4 LBT on LBT directions corresponding to the transmitting directions of the UEs, which will adopt the 25 us LBT, before the DL transmission. If the eNB selects to perform the DL Cat-4 LBT on partial directions, the eNB cannot indicate the UE to perform the 25 us LBT on other directions, or the eNB cannot indicate any UE, which performs the transmission in the MCOT, to perform the 25 us LBT.

For another instance, if the direction m' of directional LBT, which is performed before the DL signal is transmitted, corresponds to the direction n of the UL transmission of the scheduled UE and the UL transmission of the scheduled UE is still in the MCOT, the eNB may determine that the LBT type indication may be that indicating to perform the 25 us LBT; otherwise, the eNB may determine that the LBT type indication may be that indicating to perform the Cat-4 LBT. If the direction m' of directional LBT, which is performed before the DL signal is transmitted, does not correspond to the direction n of the UL transmission of the scheduled UE, no matter whether the UL transmission of the scheduled UE is in the MCOT, the eNB may indicate the UE to perform the Cat-4 LBT.

Further, preferably, the LBT type indication transmitted by the eNB may be borne by UL grant, which may be used for scheduling the UE, or may be borne by DL cell common signaling, such as C-PDCCH.

Preferably, when the LBT type indication is borne by the cell common signaling, the cell common signaling may further include direction information of signals transmitted by the eNB and direction information of the LBT. This direction information may be used by the UE to compare the direction information of the received signals and the direction of the UL transmission of the UE in block 302, to determine whether the indicated LBT type is applicable.

Preferably, the direction information in the cell common signaling may be explicitly indicated in the cell common signaling, or may be implicitly indicated by resources used by the cell common information. For instance, different sequences may be used in Cyclic Redundancy Check (CRC) scrambling, or different frequency resources may be used to indicate the direction information.

At block 302, the second transmitting node may receive the LBT type indication from the first transmitting node, determine the LBT type of the second transmitting node according to the LBT type indication and perform the LBT according to the LBT type.

Preferably, the UE may determine the LBT type according to the received LBT type indication. Specifically, when the UE receives the LBT type indication via the UL grant, and the UE may determine the LBT type according to the UL grant indication. If the UE receives the LBT type indication via the C-PDCCH, the UE may determine the LBT type according to the LBT type indication received via the C-PDCCH. Further, generally, the transmission of the C-PDCCH may be directional. If the UE receives the LBT type indication via the C-PDCCH, it may show that the transmitting direction of the UL signal and LBT direction may correspond to the transmitting direction of the DL signal, if the C-PDCCH carries the 25 us LBT indication, whether the UL transmitting sub-frame is in the MCOT indicated by the C-PDCCH may need to be determined without determining whether the direction information carried by the C-PDCCH corresponds to the transmitting direction of the UL signal. When the UL transmitting sub-frame is in the MCOT indicated by the C-PDCCH, the 25 us LBT may be performed; otherwise, the Cat-4 LBT may be performed, or the LBT type may be determined according to the predefined LBT type.

In alternative, preferably, when the 25 us LBT is performed according to the LBT type indication received via the cell common signaling (such as C-PDCCH), the UE may further determine whether the direction m or m' indicated by the direction information, which may be carried by the cell common signaling (such as C-PDCCH), may correspond to the direction n of the UE UL transmission. When the direction m or m' corresponds to the direction n of the UE UL transmission, and the UL transmitting sub-frame is in the MCOT indicated by the C-PDCCH, the 25 us LBT may be performed; otherwise, the Cat-4 LBT may be performed or the LBT type may be determined according to the pre-defined LBT type.

Further, in view of the above, in the conventional method, the C-PDCCH may indicate which sub-frames are in the MCOT and which sub-frames are not in the MCOT, to determine whether to perform the 25 us LBT. This embodiment may be indicated via this mode. After receiving the C-PDCCH, the UE may determine whether the UL transmitting sub-frame is in the MCOT indicated by the C-PDCCH, if the UL transmitting sub-frame is in the MCOT indicated by the C-PDCCH, the 25 us LBT may be performed; if the UL transmitting sub-frame is not in the MCOT indicated by the C-PDCCH, the LBT type may be determined according to the UL-grant indication or pre-defined LBT type. In an alternatively, before performing the 25 us LBT, whether the UL transmitting direction corresponds to the direction information carried by the C-PDCCH may be further determined, and the 25 us LBT when the UL transmitting direction corresponds to the direction information carried by the C-PDCCH. When the UL transmitting direction does not correspond to the direction information carried by the C-PDCCH, the LBT type may be determined according to the UL-grant indication or the pre-defined LBT type.

Preferably, the corresponding relationship between the direction m or m' indicated by the direction information carried by the C-PDCCH and the direction n of the UL transmission of the UE may be the same as that between the direction i and the direction j in the embodiment 1 or that between the direction j' and the direction i' in the embodiment 2 in the present disclosure.

For instance, as shown in FIG. 9, the eNB may schedule DL data services of the UE1 and the UE3 and schedule the UL data services of the UE1 and the UE2. The eNB may perform the LBT on the beam direction 1. After the eNB successfully performs the LBT on the beam direction 1, the eNB may use the beam direction 1 to transmit the DL data services for the UE1, transmit consecutive two sub-frames (sub-frame n and sub-frame (n+1)) and the transmit the DL data services (sub-frame (n+2)) for the UE3 on the beam direction 1. The eNB may schedule the UE1 to transmit UL services on the sub-frame (n+4) and the sub-frame (n+5), and schedule the UE2 to transmit the UL services on the sub-frame (n+6). Suppose that all the UL scheduling is cross-carrier scheduling, for instance, the UL grant may be transmitted on the LFB carrier. Suppose that the length of the MCOT is 6. Both the UE1 and the UE2 receive the C-PDCCH signaling including the MCOT information in the sub-frame (n+2), to indicate that the MCOT may end at the end of the sub-frame (n+6). Suppose that the C-PDCCH includes the direction information indication, indicating that the beam direction may be 1, the UE may perform the 25 us LBT according to the LBT in the MCOT. However, although the UE2 is in the MCOT in time, since the beam directions do not correspond to each other, the UE2 only may perform the Cat-4 LBT according to the LBT, which may be performed outside of the MCOT.

In the above FIG. 9, generally, when the transmission of the C-PDCCH is based on the beam direction 1, the UE2 cannot receive the C-PDCCH information. The direction information may be carried on the C-PDCCH to prevent following problems: in order to avoid that the UE2 may correctly demodulate the C-PDCCH with a relative low Signal to Noise Ratio (SNR), when the C-PDCCH does not include the direction information, the UE2 may perform the LBT according to the method for sharing the MCOT when the C-PDCCH is demodulated, and the UE2 may adopt the 25 us LBT. However, in practice, the eNB does not perform the DL Cat-4 LBT on the beam direction 2, therefore, the UE2 may occupy the UL channel with a much radical mode. In order to avoid the above problem, preferably, this embodiment may carry the direction information on the cell common signaling (such as the C-PDCCH).

After the LBT is performed, with regard to the transmission direction corresponding to a direction, which have passed the LBT, the second transmitting node may perform the signal transmission on the corresponding the transmission direction. The corresponding relationship between the LBT direction and the transmission direction may be the same as that between the direction i and the direction j in the embodiment 1 or that between the direction j' and the direction i' in the embodiment 2 in the present disclosure.

Embodiment 4

In the existing LTE system, a carrier working at the LFB may periodically transmit DRSs in a Discovery Measurement Timing Configuration (DMTC) window, and the position of the DRS in the DMTC window may be fixed. However, in the LAA system, the position of the DRS in the DMTC window may not be fixed and the DRS may be located at any sub-frame in the DMTC window.

When the UFB adopts united beam forming, the DRS may need to be transmitted on different beam directions, so that UEs on each direction of the cell may have the chance to detect the DRS.

Preferably, the DRS may at least include a Primary Synchronization Signal (PSS)/Secondary Synchronization Signal (SSS) and a Reference Signal (RS) performing Radio Resource Management (RRM) measurement, or may further include an RS, which may be related to beam measurement, such as Beam Reference Signal (BRS). For the convenience of description, these signals may be called DRSs. Other RSs, which may be periodically transmitted and used to perform measurement, may also be applicable in this embodiment.

In this embodiment, the method for transmitting the DRS on the UFB may include:

At block 401, omnidirectional or directional LBT may be performed.

At block 402, the DRS may be transmitted on a transmitting direction corresponding to the direction, which may have passed the LBT.

Preferably, in this embodiment, when the eNB transmits the DRS, the eNB may transmit the DRS of each direction in the DMTC window. The position of the DRS of each direction in the DMTC window may be fixed, or sequence of the DRS of each direction in the DMTC window may be fixed. However, the position may not be fixed, or the sequence and position of the DRS of each direction in the DMTC window may not be fixed.

With regard to the situation that the position of the DRS of each direction in the DMTC window is fixed, the position of the DRS of each direction in the DMTC may be pre-defined or configured in high-level.

Preferably, when the position of the DRS of the each direction in the DMTC window is fixed, and the eNB performs the omnidirectional LBT, the eNB may begin to perform the LBT from the starting point of the first DRS. When the eNB cannot finish the LBT before a DRS transmission position, the eNB may not perform the DRS transmission on the direction corresponding to the DRS transmission position, begin to transmit DRSs on corresponding directions from a DRS transmission position, which may be closest to a position, at which the LBT may finished, i.e. from the transmission position of a first DRS behind a position, at which the LBT may finished, and continuously transmit the rest of DRSs, as show in FIG. 10.

Preferably, when the position of the DRS of each direction in the DMTC window are fixed, and the eNB performs the directional LBT, the eNB may perform the LBT before each fixed DRS transmission position. When the DRS of a direction does not pass the LBT, the DRS of this direction may not be transmitted. If the DRS of a direction passes the LBT, the DRS of this direction may be transmitted, as shown in FIG. 11.

With regard to a situation that the sequence of the DRSs of each direction in the DMTC is fixed, while the positions of the DRSs of each direction in the DMTC are not fixed, the sequence of the DRSs of each direction in the DMTC window is fixed, while the starting point of the DRS in the DMTC window may not be fixed, and may be any of the multiple starting points in the DMTC window for transmitting the DRSs.

Preferably, when the transmitting sequence of the DRSs is fixed, while the starting points of the DRSs in the DMTC window are not fixed, and the eNB performs the omnidirectional LBT, the eNB may begin to perform the LBT before the possible starting point of the first DRS. When the LBT is not finished, the LBT may be re-performed before a next possible starting point of the DRS, and so on, until the LBT is finished. The DRS of a first direction may be transmitted from a starting point in which the DRS may occur and the LBT may succeed, and the rest of DRSs may be continuously transmitted.

The possible starting point of the first DRS may be pre-defined or configured. Preferably, length of one DRS may be taken as a unit or total length of all DRSs may be taken as the unit. For instance, the total length of all DRSs may be close to the length of one sub-frame. The possible starting point of the first DRS may be the starting point of each sub-frame, as shown in FIG. 12. For instance, the length of each DRS is Lx, the possible starting point of the first DRS may be the position, which is multiple of the Lx in the DMTC window, or the position, which is multiple of the Lx in the DMTC window, plus an offset of the length of one LBT, as shown in FIG. 13.

Preferably, when the transmitting sequence of the DRS is fixed and the starting point in the DMTC window is not fixed, and the eNB performs the directional LBT, the eNB may perform the LBT on each direction in turn according to the transmitting sequence of the DRS of each direction. With regard to the LBT of each direction, the LBT may be performed before the possible starting point of the DRS of each direction. When the LBT is not passed, the LBT may be re-performed before a next possible starting point of the DRS of the corresponding direction in turn, and so on, until the LBT is passed. With the above mode, although the position of each DRS is not fixed, according to a predefined direction sequence of each DRS, when the DRS, the direction of which is arranged in the front, is not successfully transmitted, the LBT, the direction of which is arranged in the back, may not be performed, and the DRS, the direction of which is arranged in the back, may not be transmitted, as shown in FIG. 14.

Preferably, when the starting point of the DRS in the DMTC window is not fixed, and the eNB performs the directional LBT, the eNB may perform the LBT before the possible starting point of the each DRS. When the LBT is not finished, the LBT may be re-performed before a next possible starting point of the DRS. The position of each DRS may not be fixed, the sequence may also not be fixed, as shown in FIG. 15.

Preferably, when the positions and sequence of the DRSs are not fixed, the transmitted DRS may need to identify the direction. Preferably, when the sequence of the DRS of each direction is the same and control signaling may also need to be transmitted along with the DRS, the control signaling may include information, which may directly or indirectly indicate the direction. In an alternative, preferably, the sequence of the DRS of each direction may be different, for instance, different basic sequences may be adopted, or different scrambling codes may be adopted, or different cyclic shift may be adopted, or different direction information may be borne by the DRS signal.

With this mode, the UE may determine the correspond direction after receiving the DRS at an uncertain position. If the position of each DRS is fixed, the UE may determine the corresponding direction according to a time position, at which the DRS may be received, without extra indication. However, when the position of each DRS is fixed, the probability for transmitting the DRS may be reduced.

Preferably, when the signal for occupying the channel is transmitted before transmitting the DRS, the length of the signal for occupying the channel should not exceed the pre-defined length Lx.

Preferably, when the eNB is able to simultaneously perform the LBT on multiple directions, the eNB may also be able to transmit the DRS on the multiple directions, which may have passed the LBT.

Preferably, the eNB may configure the number of transmitted directional DRSs. For instance, the eNB may make a configuration of transmitting the DRSs of partial directions.

Preferably, the eNB may configure a period for DRS of the each direction.

It may be seen from the above embodiment, this embodiment may be a specific instance of the embodiment 1. When the signal transmitted in the embodiment 1 is the DRS, the embodiment 1 may be the same as this embodiment. Therefore, the detection direction and the transmitting direction of the DRS have a relationship, which may be the same as that in embodiment 1, i.e. the corresponding relationship between the direction i and the direction j in the embodiment 1. The corresponding relationship may not be repeated in this embodiment.

Embodiment 5

On the carrier of the high frequency band, path loss may need to be compensated with the beam forming. Therefore, the signal used to measure the beam, such as Beam Reference Signal (BRS) or Beam Refinement Reference Signal (BRRS), may need to be transmitted. These signals may need to be transmitted on multiple directions in a beam sweep mode.

When the BRS/BRRS is periodically transmitted, since the LBT cannot ensure to transmit the BRS/BRRS at corresponding time points, the BRS/BRRS may be not able to be periodically transmitted on the UFB.

Preferably, when the transmitting node only transmits the BRS/BRRS, but not transmit other data, the transmitting node may use the LBT, which may be faster than that for transmitting the data, to transmit the BRS/BRRS. If the BRS/BRRS is transmitted together with the data, the BRS/BRRS may be transmitted adopting the LBT type, which may be the same as that for transmitting the data.

Preferably, (1) When the transmitting node performs the omnidirectional LBT before transmitting the BRS/BRRS, and the LBT succeeds before the Nth beam of the beam sweep (about M beams), the transmitting node may successively perform the transmission until the M-th beam from the N-th beam.

(2) When the transmitting node performs the omnidirectional LBT before transmitting the BRS/BRRS, with regard to the BRS/BRRS of a direction, which is not immediately transmitted after the LBT is finished, the fast omnidirectional LBT or the fast LBT of the corresponding direction, such as the second or third LBT in the embodiment 1, may need to be performed again before transmitting the BRS/BRRS of the direction. For instance, there may be BRSs of 14 directions. The positions of the BRSs of 14 directions may be ranked in turn according to the time and may respectively correspond to the first to the fourteenth symbols. Suppose that the eNB may finish the omnidirectional LBT before the fifth symbol, the eNB may begin to transmit the BRS of the direction 5 from the fifth symbol. Before transmitting the BRS at the sixth to fourteenth symbols, the eNB may respectively perform the fast LBT.

(3) When the transmitting node performs the directional LBT before transmitting the BRS/BRRS, before transmitting the BRS/BRRS on each direction, the transmitting node may need to perform the LBT on the corresponding direction.

The transmission of the beam measurement signal in this embodiment may be one instance of the embodiment 1, in which the transmitted signal may be the beam measurement signal.

The above embodiments are the methods for performing the LBT and the signal transmission on the UFB provided by embodiments of the present disclosure. The present disclosure also provides a device for performing the LBT and signal generation on the UFB, which may be used to execute the above method.

Specifically, with regard to embodiment one, basic structure of a device for transmitting signals provided by an embodiment of the present disclosure may be shown in FIG. 16. In FIG. 16, the device for transmitting the signals may include: an LBT unit and a signal transmitting unit.

The LBT unit may be configured to perform a first type of LBT on a direction i, and send a notification to the signal transmitting unit after passing the first type of LBT. The signal transmitting unit may be configured to transmit signals on a direction j after receiving the notification from the LBT unit, wherein the direction i is omnidirectional, or one or multiple beam directions corresponding to the direction j.

With regard to embodiment two, basic structure of a device for detecting carriers provided by an embodiment of the present disclosure may be shown in FIG. 17. In FIG. 17, the device may include: a reference sub-frame determining unit and an LBT unit.

The a reference sub-frame determining unit may be to determine a reference sub-frame used for LBT of a current sub-frame according to a transmitting direction of the current sub-frame. The LBT unit may be to adjust a CWS of the LBT of the current sub-frame according to a statistical result of ACK/NACK information of the reference sub-frame, and perform LBT for the current sub-frame.

With regard to embodiment three, basic structure of a first transmitting node device provided by an embodiment of the present disclosure may be shown in FIG. 18. In FIG. 18, the first transmitting node device may include: an LBT type indication determining unit, and an LBT type indication transmitting unit.

The LBT type indication determining unit may be configured to determine an LBT type indication, which is to be transmitted to a second transmitting node, according to a direction used by the first transmitting node for transmitting signals, and/or a direction of LBT, and a direction used by the scheduled second transmitting node for transmitting signals. The LBT type indication transmitting unit may be configured to transmit the LBT type indication, with which the second transmitting node performs the LBT on the UFB.

With regard to embodiment three, basic structure of a second transmitting node device provided by an embodiment of the present disclosure may be shown in FIG. 19. In FIG. 19, the second transmitting node device may include: a receiving unit, an LBT unit and a transmitting unit.

The receiving unit may be configured to receive an LBT type indication from the first transmitting node. The LBT unit may be configured to perform the LBT on the UFB according to the LBT type indication. The transmitting unit may be configured to transmit signals on a transmission direction corresponding to a direction, which may have passed the LBT.

With regard to embodiment four, basic structure of a signal transmitting device provided by an embodiment of the present disclosure may be shown in FIG. 20. In FIG. 20, the signal transmitting device may include: an LBT unit and a DRS transmitting unit.

The LBT unit may be configured to perform omnidirectional or directional LBT. The DRS transmitting unit may be configured to transmit DRSs on a direction, which may have passed the LBT.

In V2X communications, device (UE) participated in communications may be divided into several types, such as Vehicle UE (VUE), Pedestrian UE (PUE) and Roadside units (RSU). The power supply of part of the devices is not a limiting factor, such as a vehicle, hereinafter referred to as a VUE, which may detect channel continuously, so that the selecting resource may be completed by detection results in the N subframes before the resource reselection timing, N equals to 1000. Another type of device, such as pedestrians, hereinafter referred to as PUE, of which power supply is limited, extending the communication time is a problem need to solve. It is assumed that the data transmission mechanism of the UE includes, first of all, the UE sends information in a control channel used for indicating information such as time-frequency resources occupied by data channel and modulation coding scheme (MCS), wherein, the control channel referred to as a scheduling assignment (SA); next, the UE transmits data in the scheduled data channel. For an LTE D2D/V2X system, the SA is also called PSCCH, and the data channel is also called PSSCH. For an device, because its data is generated in a cycle, the device may occupy resource cyclically; and each data can be sent K times repeatedly, K is greater than or equal to 1, thus the problem that part of the devices may not receive the data because of the restrictions of half duplex operation is avoided. Correspondingly, for the device, it needs to occupy resources with the period P and the resources of K subframes are occupied in a period. FIG. 22 is a flow chart illustrating the method for transmitting control signaling and data of the present disclosure, which comprises the following steps:

Step 2201: The UE performs resource selection or reselection (hereinafter referred to as resource selection/reselection) to select resources for transmitting a scheduling assignment SA signaling and data channels (hereinafter, the resource used for transmitting the data channel is referred to as data channel resources).

When performing resource selection/reselection, the UE may completely random to select the resources to be occupied, that is, to avoid collision between different UEs as much as possible by randomization. By this method, when the system load is relatively heavy, the probability of collision will increase. In order to solve this problem, another method is based on the sensing. That is, the UE may avoid collision with other UEs as much as possible and improve system performance through sensing the SA of the other UEs and measuring the received power of the data channel scheduled by the correctly received SA, and measuring the received energy of each subband of each subframe in the resource pool.

Step 2202: Based on the SA and the resource for transmitting the data channel selected in step 2201, the UE transmits the SA to indicate the selected resource for transmitting the data channel and transmits the corresponding data.

When a data is transmitted only one time, the SA indicates a data channel resource that is scheduled by it. When a data is transmitted K times repeatedly, K different data channel resources is occupied necessarily, K is greater than or equals to 1, for example, K equals to 2, and SA may indicate all of the K resources or only part of the K resources. According to the timing relationship between SA and data channel scheduled by it, the scheduling type may be divided into the following three types:

scheduling type 1: the SA and a data channel scheduled by the SA are located in the same subframe;

scheduling type 2: the SA and any one of data channels scheduled by the SA are not located in the same subframe; and scheduling type 3: the SA and a data channel scheduled by the SA are located in the same subframe, or, the SA and any one of data channels scheduled by the SA are not located in the same subframe. In fact, the scheduling type 3 may also be considered to allow the UE to determine to use the scheduling type 1 or the scheduling type 2 dynamically.

The scheduling type used by a resource pool may be configured with high layer signaling semi-statically.

Technical scheme of the present disclosure will now be described in further detail by the preferable embodiments with reference to the accompanying drawings.

Embodiment 6

In V2X communication, the UE transmits the SA to indicate data channel schedule by the SA and other parameters, and transmits corresponding data.

Since a data channel scheduled by the SA and the SA is located in the same subframe as for the scheduling type 1, so it is not necessary to indicate explicitly the time position of the data channel. In addition, since 3GPP defines the correspondence relationship between the resources occupied by the SA and the data channels scheduled by the SA in the same subframe, so it is not necessary to indicate explicitly the frequency position of the data channel. That is, assuming that the SA and the data channels scheduled by the SA occupy continuous PRBs, the SA occupies two PRBs with lowest frequency of one or more consecutive subchannels scheduled by the SA; assuming that the SA and data channels scheduled by it occupy discontinuous PRBs, resource index of the SA equals to the minimum among indexes subchannels the data channel scheduled by the SA. For the scheduling type 1, Table 1 shows the information field and number of bits included in the standardized SA of the current 3GPP. The retransmission index is used to distinguish whether the current SA is the scheduling initial transmission or the scheduling retransmission; the time gap refers to the interval of the subframes occupied by the two data channels of a corresponding data. According to the value of retransmission index, when the retransmission index is 0, the time gap is a positive value, and when the retransmission index is 1, the time gap is a negative value; the frequency resource field of Table 1 only needs to indicate the number of scheduled subchannels and the starting subchannel index of another data channel scheduled by the SA. In addition, as for the requirements of forward compatibility, the SA contains seven reservation bits, and the reservation bit is set to zero.

TABLE 1

The information field of the SA of the scheduling type 1

| Information field | Number of bits |
|---|---|
| priority | 3 |
| MCS | 5 |
| reservation period | 4 |
| retransmission index | 1 |
| time gap | 4 |
| frequency resource | 8 |
| reservation bits | 7 |
| CRC | 16 |
| total number of bits | 48 |

As for the scheduling type 2 or the scheduling type 3, the total number of bits of the SA may equals to the total number of bits of the SA of the scheduling type 1. So, assuming that a UE is configured with two SA resource pools and uses different scheduling types respectively for the two SA resource pools, and assuming that two SA resource pools are completely overlapped or partially overlapped, by configuring the total numbers of bits of SA of the two scheduling types are equivalent, blind detection operation of the receiving UE for SA may be reduced. Except for the information fields shown in Table 1, the SA of the scheduling type 2 or the scheduling type 3 also requires some additional information to indicate the scheduling time-frequency resource. For example, the additional information needs to indicate the time-frequency resource of a data channel scheduled by the SA, hereinafter referred to the data channel for data channel scheduling directly. Then, according to retransmission index, time gap and frequency resource in table 1, the time-frequency resource of another data channel scheduled by the SA is determined. The additional information above may be transmitted by occupying the reservation bits in the SA of the scheduling type 1.

A piece of information is required to distinguish between the scheduling type 1 and the scheduling type 2, which may occupy one bit in the SA independently, or may be encoded in association with other information. If occupying a reservation bit in the SA of the scheduling type 1 is used to distinguish the scheduling types, the scheduling type 1 may be represented by the reservation bit value of '0', which is consistent with the setting of the reservation bits in the SA of the scheduling type 1; and the scheduling type 2 may be represented by the reservation bit value of '1'.

The other required piece of information is the subframe gap between the SA and data channel directly scheduled by the SA. The subframe gap may be a predefined constant, such as 4; or a value configured by a higher layer signaling; or, the subframe gap may be a randomly selected value within a range, thereby the possibility of collision of the SA and the data channel is reduced. There are two cases:

It is assumed that one bit in the SA is used to distinguish between the scheduling type 1 and the scheduling type 2 and N bits are used to indicate the subframe gap, N is greater than or equals to 1, then the range of the subframe gap may be $1, 2, \ldots, 2^N$.

Or, assuming that the information to distinguish the scheduling types and the subframe gaps are coded jointly by N bits, then one codeword indicates the scheduling type 1, the other $2^N-1$ codewords indicate the scheduling type 2 and are used to distinguish the $2^N-1$ subframe gaps, such as 1, $2, \ldots, 2^N-1$. For the N reservation bits in the SA of the scheduling type 1 are occupied to jointly indicate to distinguish condition of the scheduling types information and condition of the subframe gaps, a full '0' codeword may indicate the scheduling type 1, which is consistent with the setting of the reservation bits in the SA of the scheduling type 1 shown in Table 1; and the other $2^N-1$ code-words indicate the scheduling type 2 and may distinguish the $2^N-1$ subframe gaps.

By the method that N bits are coded jointly to distinguish the scheduling types and the subframe gaps, distinguishing between the scheduling type 1 and the scheduling type 2 dynamically is supported, such SA indicates the subframe gap according to the scheduling type 3 actually.

When a group of data is transmitted K times, the subframe gaps of each SA to the data channel scheduled by the SA may be made to be equal, accordingly, the subframe gaps in K SAs may be set to the same value. By this method, information of another SA may be completely determined based on information of an SA. Since the DMRS sequence and the scrambling code of the data channel are obtained from the CRC of the SA, the CRC of the K times' transmissions of the data channel may be calculated from an SA to obtain the DMRS sequence and the scrambling code of the data channel of the K times' transmissions. Alternatively, when a data is transmitted K times, the subframe gaps in K SAs may be selected independently, for example, random selecting. By this method, based on the information of an SA, the value of the subframe gap in another SA may not be determined. In order to ensure that the CRC of the K times' transmissions of the data channel may be calculated from an SA, CRC may be computed based on the other field other than the subframe gap field in the information field of SA.

The calculated CRC is dedicated to generating DMRS sequences and scrambling codes, but not for transmitting SAs.

Another piece of information that may be needed is the starting subchannel occupied by the data channel scheduled by the SA directly, so that the frequency resources occupied by the SA and the data channel may be selected flexibly, occupying the same SA and data channel by multiple UEs is avoided as much as possible. For example, the V2X system supports up to 20 subchannels, then this information takes 5 bits. Or, from the point of view of reducing the overhead of the SA, being similar to the scheduling type 1, by defining the correspondence relationship between the resources occupied by the SA and the subbands of the data channel scheduled by the SA directly, so the starting subchannel is not necessary to be indicated explicitly in the SA, so the overhead of SA is reduced. For example, the index of the SA resource equals to the minimum among indexes the subchannel of the data channel scheduled directly by the SA. The present disclosure does not limit the use of other methods of associating SA resources and data channels.

For example, it is assumed that the information to distinguish the scheduling types and the subframe gap are jointly encoded and it is assumed that the correspondence relationship between the resource occupied by the SA and the subbands of the data channel scheduled by the SA directly is defined, Table 2 shows the composition of the information field of the SA supporting the scheduling type 2.

TABLE 2

The information field of the SA of the scheduling type 2

| Information field | Number of bits |
| --- | --- |
| priority | 3 |
| MCS | 5 |
| reservation period | 4 |
| retransmission index | 1 |
| time gap | 4 |
| frequency resource | 8 |
| scheduling type and subframe gap | 3 |
| reservation bit | 4 |
| CRC | 16 |
| total number of the bits | 48 |

Embodiment 7

In V2X communication, the UE transmits the SA to indicate the scheduled data channel and other parameters, and transmits corresponding data on the scheduled data channel. Assuming that a group of data requires K times transmissions and retransmissions, for example, K equals to 2, according to the method of embodiment 6, the SA may implicitly or explicitly indicate time-frequency resources for scheduling a data channel, hereinafter referred to as the data channel for the directly scheduled data channel, and then time-frequency resources of another data channel scheduled by the SA may be determined according to the retransmission index, time gap and frequency resource field in the Table 1. For the scheduling type 2, the indication method of the time-frequency resources of the SA and the data channel scheduled by the SA is proposed and described below in the present embodiment.

The first method is that each SA of the K SAs scheduling the same data directly schedule a different data channel resource respectively. As shown in FIG. 23, assuming that K equals to 2 and the retransmission index of a SA1 (2301) is set to 0, so the first data channel resource (2311) is directly scheduled, that is, indicating an interval between the subframe where the SA1 is located and the subframe where the first data channel is located, in the SA1, in conjunction with the time gap field in the SA1, the subframe of the second scheduled data channel may be got. The retransmission index of a SA2 (2302) is set to 1, so the second data channel resource (2312) is directly scheduled, that is, indicating an interval between the subframe where the SA2 is located and the subframe where the second data channel is located in the SA2, in conjunction with the time gap field in the SA2, the subframe of the first scheduled data channel may be got. With this method, it is assumed that an interval between the SA and data channel scheduled by it directly is 1, 2, . . . , L, L depends on the number of bits indicating the interval in the SA, then the SA1 may only be transmitted within the L subframes before the subframe in which the first data channel is located, the SA2 may only be transmitted within L subframes before the subframe in which the second data channel is located. When the L value is small, the probability that the SA2 is located after the subframe of the first data channel is relatively large. According to the existing standard, if the receiving UE does not receive the SA1 and only receives the SA2, the receiving UE may not need to receive the data transmission on the first data channel, and not need to measure the received power on the first data channel, which is detrimental to the system performance in a certain degree. The SA2 may also be located before the scheduled subframe in which the first data channel is located, when the subframe interval of the two data channels scheduled by the SA is relatively small.

The second method is to allow multiple SAs scheduling the same group of data to schedule same data channel resources directly. Taking K for 2 as an example, that is, two SAs corresponding to a group of data is allowed to indicate a first data channel resource directly. As shown in FIG. 24, assuming that K is equal to 2, the retransmission index of SA1 (2401) is set to 0, so the first data channel resource (2411) is directly scheduled, that is, indicating an interval between the subframe where the SA1 is located and the subframe where the first data channel is located, in the SA1, in conjunction with the time gap field in the SA1, the subframe of the second scheduled data channel may be got. Similar to FIG. 23, the retransmission index of SA2 (2403) is set to 1, so the second data channel resource (2412) is directly scheduled, that is, indicating an interval between the subframe where the SA2 is located and the subframe where the second data channel is located, in the SA2, in conjunction with the time gap field in the SA2, the subframe of the first scheduled data channel may be got. In addition, the retransmission index of SA2 (2402) is also allowed to set to 0, so that the SA2 actually also directly schedules the first data channel resource (2411), that is, similar to the SA1, the SA2 indicates the interval between subframe where SA2 is located and the subframe where the first data is located, in conjunction with the time gap field in the SA2, the subframe of the second scheduled data channel may be got. With this method, it is assumed that an interval between the SA and data channel scheduled by it directly is 1, 2, . . . , L, L depends on the number of bits indicating the interval in the SA, then the SA1 may only be transmitted within the L subframes before the subframe in which the first data channel is located; dependent on the UE to implement, the SA2 may only be transmitted within L subframes before the subframe in which the second data channel is located, or may be transmitted within L subframes before the subframe where the first data channel is located. In this way, the SA2 may still be located before the subframe in which the first data channel is located, by a larger probability. When the receiving UE does not receive the SA1 and only receives the SA2, it is still possible for the receiving UE to receive the data transmission on the two data channels and to measure the received power, thereby the negative impact of factors such as half-duplex is reduced. In addition, the method improves the freedom degree when selecting the SA2 resources, which is beneficial to reduce the collision.

Embodiment 8

In V2X communication, the UE transmits the SA to indicate the scheduled data channel and other parameters, and transmits corresponding data on the scheduled data channel.

For PUE, in order to reduce energy consumption, time of transmitting data of PUE is reduced as much as possible. For example, if a group of data needs to be sent twice, the PUE needs to occupy 2 subframes to transmit data if using the scheduling type 1. If the scheduling type 2 is used, the PUE needs to occupy 4 subframes to transmit data. From the point of view of reducing energy consumption, the scheduling type 1 is more effective. In addition, in order to perform resource selection/reselection based on sensing, the PUE may detect only on part of the subframes. The VUE may select resources based on the detecting information of N subframes, N is equal to 1000. For PUE, it may detect only part of the N subframes, thereby the energy loss is reduced. For example, as shown in FIG. 25, the PUE may detect a channel with a period P, for example, P is equal to 100, and only S subframes are detected in each period. Assuming the scheduling type 2 is used, because the PUE detection is not continuous, the problem as shown in FIG. 26 may appear. That is, an interfering device transmits data D1 (2611) within the actual detection period S, but since the corresponding SA (as the figure shown SA1 (2601) is located before the actual detection period, which causes that the PUE may not measure the received power of the interfering device. The SA of another interfering device (SA2 (2602) as shown) is transmitted within the actual detection period S, but since the data D2 (2612) corresponding to SA2 is located after the actual detection period, the PUE still may not measure the received power of the interfering device, that is the receiving SA2 is useless. By the scheduling type 1, since the SA and data channel scheduled by the SA are located in the same subframe, the PUE can simultaneously receive SA and the data channel scheduled by the SA so that the received power on the data channel corresponding to the SA may be measured. By configuring the PUE to use the scheduling type 1, That PUE may detect the received power from the other PUEs as much as possible within its actual detection period S may be ensured at least. However, if the VUE uses the scheduling type 2, the detecting performance for the VUE still may not be improved.

When the PUE needs to share resources with other UEs, according to the analysis above, the PUE may adopt the scheduling type 1, which is conductive to reducing the power consumption of the PUE. It is assumed that the resource pool configured by the VUE adopts the scheduling type 2, the resource pool of the PUE may be configured to be overlapped completely or overlapped partially with the resource pool of the VUE, and the resource pool of the PUE is configured with the scheduling type 1. Or, for a resource pool, scheduling type used by the VUE and scheduling type used by the PUE may be configured respectively. For example, the VUE may be configured to use the scheduling type 2 and the PUE may be configured to use the scheduling type 1. With this approach, a resource pool may rely on different device types and support multiple scheduling types. Alternatively, it is assumed that a resource pool is configured with the schedule type 2, but the PUE still uses the scheduling type 1 on the resource pool. Alternatively, it is assumed that a resource pool uses the scheduling type 3, as for a PUE, whose SA may be located in the same subframe with a data channel scheduled by the SA fixedly, which is equivalent to using the scheduling type 1; for other UEs, such as VUE, the timing relationship between the SA and data channel scheduled by the SA may be configured flexibly according to the scheduling type 2 or the scheduling type 3. With this method, through the scheduling type 3, power saving operation of PUE may be supported well, at the same time scheduling mechanism of the resource pool does not be violated.

Embodiment 9

In V2X communication, the UE transmits the SA to indicate the scheduled data channel and other parameters, and transmits corresponding data on the scheduled data channel accordingly. In order to support resource selection/reselection, the PUE may be detected only on part of the subframes, for example, as shown in FIG. 25, the detection period is P, and only the S subframes of the actual detection period are detected in each cycle. According to the analysis of the embodiment 8, for the interfering device using the scheduling type 2 or the scheduling type 3, it is possible that the SA or data channel scheduled by the SA is not within the actual detection period S, and thus the received power of the interfering device may not be measured.

For the scheduling type 2 or the scheduling type 3, an important parameter is the range of subframe gaps between the SA and data channel scheduled by the SA directly. When the PUE and other UEs share the time-frequency resources, because the PUE may only receive the data transmission within the actual detection period S, reducing the range of the subframe interval may improve the probability of detecting the SA and data channel scheduled by the SA at the same time, by the PUE, so the received power of the data channel of scheduled by the SA is measured and the collision probability of the PUE and other UEs is reduced. In addition, if there is no PUE, the greater range of values of the subframe interval is advantageous to reduce the collisions likelihood of SA and data channel. In this case, for a resource pool, when the scheduling type 2 or the scheduling type 3 is configured, the range of the subframe interval may be further configured. For example, for a downtown scenario, it is assumed that when the PUE and other UEs share time-frequency resources, a smaller range of values is configured for subframe intervals, such as a positive integer less than or equaling to 4; for scenarios on the highway, PUE may not be given priority, so a larger range of values is configured for subframe intervals, such as a positive integer less than or equaling to 8. With this method, the PUE may operate in accordance with the method of Embodiment 8, that is, the SA of the PUE and a data channel scheduled by the SA are located in the same subframe. Alternatively, with this method, PUE may also use the same scheduling type as other devices according to the configuration of the resource pool. For example, when the PUE shares time-frequency resources with other UEs, the PUE also uses the scheduling type 2 and the range of the subframe interval is smaller relatively.

Embodiment 10

In V2X communication, the UE transmits the SA to indicate the scheduled data channel and other parameters, and transmits corresponding data on the scheduled data channel. For an device, since its data may be generated by the period, so that the device needs to occupy resources periodically; and, each group of data can be send K times repeatedly, K is greater than or equals to 1, thus the case that some devices fail to receive this data caused by the restrictions of half-duplex operation is avoided. Correspondingly, for the device, it occupies the resources by the period P and occupies the resources of the K subframes in one period. For an device, it is necessary to release the resource and re-execute the resource selection after selecting a certain resource and occupying the resource for several cycles. The purpose of this is to prevent the adjacent device from selecting the same resource which leads to collide continuously. Selecting/reselecting a resource of each time, number of cycles (C) occupying the same resource continuously may be generated first randomly in the range of $[P_{min}, P_{max}]$ and the resources that may be occupied C cycles consecutively is selected, $P_{min}$ and $P_{max}$ is a predefined constant or configured value, for example, equaling to 5 and 15 respectively; then decreasing by 1 after each transmission of a data, and resource reselection is performed when the resource reselection counter is reset to zero.

According to the progress of 3GPP, as shown in FIG. 27, for the scheduling type 1, the device needs to generate a random number (2701) when performing resource reselection, thereby the currently occupied SA and the data channel resource is maintained unchanged (2702) at probability p, the new SA and data channel resources (2703) is reselected with the probability of 1-p. The probability p is a value configured by the higher layer. For the scheduling type 2 or the scheduling type 3, since the SA and data channels scheduled by the SA may be located in different subframes, the SA and the data channel can be processed separately to maintain the current resource or to retransmit the new resource.

As shown in FIG. 28, the device needs to generate a random number (2801) when performing resource reselection, thereby the currently occupied data channel resource is maintained unchanged at probability p, but the new SA resource (2802) is needed to reselect, the new SA and data channel resources (2803) is reselected with the probability of 1-p at the same time.

As shown in FIG. 29, the device needs to generate a random number (2901) when performing the resource reselection, thereby the currently occupied SA and the data channel resource is maintained unchanged (2902) at the probability p1; the currently occupied data channel resource is maintaining unchanged at the probability p2, but the new SA resource (2903) is needed to reselect; and the new SA and data channel resources (2904) is reselected at probability 1-p1-p2 at the same time.

According to the analysis in Embodiment 8, in order to reduce the energy consumption, the PUE may detect only on a part of the subframes. For example, as shown in FIG. 25, the PUE may detect the data channel in the period P, for example, P is equal to 100, and only S subframes are detected in each period. With this method, transmissions according to various possible periods within time interval of the S subframes may be detected, accordingly, as long as the resource selection is confined within the subframes corresponding to the S subframes, which may maximize the avoidance of collision between the devices. It is assumed that the resource reselection is performed in the subframe n, the subframes corresponding to the S subframes after the subframe n detected by the PUE are only a part of the subframes that may satisfy the transmission demand, which is the selecting window for the PUE executing resource selection.

For the scheduling type 2 or the scheduling type 3, the SA resources and the data channel resources may be selected only in the subframe of the selecting window, or the data channel resource may be selected only in the subframe of the selecting window, the selected SA resource may be located within a subframe of the selecting window or subframes other than the subframe of the selecting window described above.

Embodiment 11

In V2X communication, the UE transmits the SA to indicate the scheduled data channel and other parameters, and transmits corresponding data transmission on the scheduled data channel accordingly. According to the analysis in Embodiment 8, in order to reduce the energy consumption, the PUE may detect only on part of the subframes. For example, as shown in FIG. 25, the PUE may detect the data channel in the period P, for example, P equals to 100, and only S subframes are detected in each period. With this method, transmissions according to various possible periods within time interval of the S subframes may be detected, accordingly, as long as the resource selection is confined within the subframes corresponding to the S subframes, which may maximize the avoidance of collision between the devices. However, since the proportion of subframes actually detected by the PUE is small, the ability to avoid collisions is correspondingly reduced. It is assumed that the resource reselection is performed in the subframe n, the subframes corresponding to the S subframes after the subframe n detected by the PUE are only a part of the subframes that may satisfy the transmission demand, which is the selecting window for the PUE executing resource selection. In the following description, all subframes that meet the transmission requirements are referred to as full selecting windows.

In the actual V2X system work, the business load may be relatively large, which will cause the interference between the UEs to be larger; the reliability of communication is reduced. In order to maintain the stability of the system, the UE needs to detect the load level of system, when the load level reaches a certain level, it is necessary to adjust the allowable parameters adaptively, so as to reduce the interference between the UEs as much as possible. The present application does not limit the method for detecting system load.

When the PUE detects that the load exceeds a certain threshold, the PUE may increase the proportion of the subframes that is actually detected. For example, according to the method of FIG. 25, the number of subframes included in the actual detection period of the PUE may be increased. With this method, because the PUE detects more subframes, thereby probability of finding the available resources of the PUE is increased. However, increasing the ratio of actually detected subframes will also cause the increasing of the energy consumption of PUE.

When the PUE detects that the load exceeds the threshold, the PUE also may not increase the proportion of actually detected subframes first, only change the location of the actually detected subframes, for example, according to the method of FIG. 25, changing the location of the actually detected subframes. When the service allocation within the full selecting window is not uniform, changing the position of the actually detected subframe may cause to transfer the data to a relatively idler subframe for transmission. Further, when the PUE detects that the load exceeds the threshold for N times consecutively, the PUE may increase the proportion of the actually detected subframe. N is a predefined constant, configured or preconfigured value.

When the PUE detects that the load exceeds the threshold, PUE may no longer be limited to selecting resource on the subframes within the selecting window corresponding to the actual detection subframes, instead, it changes to select resource randomly completely within the full selecting window. Or, when the PUE detects that the load exceeds the threshold for N times consecutively, the PUE may be changed to select resource randomly completely within the full selecting window. N is a predefined constant, configured or preconfigured value. With this method, when the actually detected subframe of the PUE is more crowded currently, but the business distribution of the full selecting window is not uniform, it may bring benefits.

Embodiment 12

It is assumed that the resource selection is performed in the subframe n, the reservation interval of the current reservation resource of the device is $P_A$, and the number of cycles of reservation resource is needed to be C. The device may select resources in the selecting window $[n+T_1, n+T_2]$ and reserve for C cycles consecutively with the interval $P_A$. $T_1$ and $T_2$ relies on the implementations of UE, for example, $T_1 \leq 4$, $20 \leq T_2 \leq 100$. The $T_1$ depends on the processing delay influence of the UE from the selecting resources to starting transmitting the SA and data, $T_2$ is mainly dependent on the delay characteristics that the current business may tolerate.

FIG. 30 is a schematic diagram illustrating the implementation of resource selection based on the detection, including:

Step 3001: The UE sets all the resources in the selecting window to be in the collection $S_A$.

Step 3002: Based on the correctly received SA, it is assumed that the SA indicates that the resource continues to be reserved after the subframe n, the UE measures the received power of the data channel scheduled by the SA, and rejects a part of the candidate resources when the received power exceeds the corresponding threshold.

Specifically, when the received power exceeds the corresponding threshold, the reserved resource Y according to the SA after the subframe n is not available, and the threshold is determined jointly based on the priority of the device performing resource selection and the priority indicated by the correctly received SA; Record that $R_{x,y}$ represents a single subframe resource in the selecting window $[n+T_1, n+T_2]$, $R_{x,y}$ is located in the subframe y, and contains one or more consecutive subchannels starting from the subchannel x, then, when the PRB of $R_{x,y+j \cdot P_A}$ overlaps with the PRB of the resource Y, $R_{x,y}$ is not available for device A, that is, $R_{x,y}$ is excluded from the collection $S_A$, j=0, 1, . . . C−1, and C is the needed number of cycles by the device A currently according to the reserve resources by cycle $P_A$.

Step 3003: The UE determines whether the remaining resource reaches the bit R of total resource, such as 20%. If the ratio is less than R, step 3004 is performed, the threshold is raised by 3 dB, and the process is re-performed from step 3001; otherwise, step 3005 continues.

Step 3005: The UE estimates the received energy of the remaining resources of the $S_A$, and moves the resources with the least amount of received energy to the collection $S_B$, until the ratio of the resources of $S_B$ is R. For a resource containing a plurality of subchannels, the received energy of the resource is the average of the received energy on the respective subchannels contained by the resource.

Step 3006: The UE randomly selects resources for data transmission from the resources of $S_B$.

Step 3007: The UE performs data transmission on the selected resource.

In the actual communication, a possible scenario is a case of heavy load, the resource selection algorithm needs to be able to continue to complete the communication function by reducing some indicators under heavy load, that is, congestion control. How to support for congestion control effectively is an urgent problem to be solved.

According to the analysis in Embodiment 8, in order to reduce the energy consumption, the PUE may detect only on a part of the subframes, for example, as shown in FIG. 25, PUE may detect the channel in periodic P, for example, P equals to 100, only S subframes are detected in each cycle. According to the method of FIG. 30, step 3003 makes the proportion of the remaining resources of the resource collection $S_A$ to be not less than R. However, when only a part of the subframes are detected by the current PUE, if the corresponding subframes are selected as a selecting window after the subframe n in accordance with part of the actually detected subframes, the number of subframes included in the selecting window is relatively small, and the remaining resources with ratio R are also a small part of the resources. For example, assuming that the PUE only detects 10 subframes in each period P, the 20% resources are equivalent to the resources in the two subframes. The number of remaining resources after step 3003 is too small to result in degradation of processing performance based on the received energy in steps 3005 and 3006. In addition, for all types of UEs, according to the method of FIG. 30, when T1 equals to 4 and T2 equals to 20, the selecting window includes only 17 subframes, 20% of the remaining resources are still relatively small values, which may cause degradation of the performance.

The present disclosure proposes that the ratio R in step 3003 is determined based on the total number of resources within the selecting window, thereby sufficient resources are provided for steps 3005 and 3006 to optimize the overall performance of the resource selection based on FIG. 30. The first method is to determine the remaining resource ratio R according to the number of subframes within the selecting window. For example, the number of subframes within the selecting window is divided into a plurality of sections and to predefine the remaining resource ratio R for each section, to pre-configure the remaining resource ratios R for each section, or to configure the remaining resources ratio R for each section by the higher layer signaling. Alternatively, the second method is that the remaining resource ratio R may be the function R=f(L) of the number of subframes L in the selecting window, so that no signaling indication is required. The present disclosure is not limited to the form of R=f(L). Alternatively, the third method is to configure the remaining resource ratio R with a higher layer signaling for a UE, and the configured ratio R is used for each resource pool of the UE. Alternatively, the third method is to configure the remaining resource ratio R with higher layer signaling for each resource pool of a UE, respectively.

Corresponding to the method, the present application also discloses a device which may be used to implement the method, as shown in FIG. 31, the device comprises a resource selection module and a transceiver module, wherein:

the resource selection module, is to select or reselect the SA and data channel resource according to the received power of the other devices, and/or combining with the received energy on each subband of each subframe in the resource pool;

the transceiver module, is to receive the SA and data channel from the other devices, and according to the selection of resource selection module, to transmit the SA and the data channel of the UE.

The device shown in the FIG. 31 also includes: detection module, is to detect the SA from the other devices, and to measure the received power of the correctly received SA and the received energy on each subband of each subframe in the resource pool.

Those skilled in the art may understand achieving all or a portion of the steps carried out by the method embodiments described above may be accomplished through a program to command the associated hardware, the program may be stored in a computer readable storage medium, when it is executed, one of the steps of the method embodiments or a combination thereof is included.

In addition, each functional unit in the various embodiments of the present application may be integrated in a processing module, or each unit may be physically present individually, or two or more units may be integrated in one module. The integrated module may be implemented in the form of hardware, and may also be achieved in the form of software function modules. The integrated module may also be stored in a computer-readable storage medium if it is implemented in the form of a software function module and is sold or used as a standalone product.

The storage medium may be a read-only memory, a magnetic disk, or an optical disk.

The foregoing only describes preferred examples of the present invention and is not used to limit the protection scope of the present invention. Any modification, equivalent substitution and improvement without departing from the spirit and principle of the present invention are within the protection scope of the present invention.

The invention claimed is:

1. A method for transmitting signals on an unlicensed frequency band (UFB) by a transmitting node, the method comprising:
    performing a first type of listen before talk (LBT) in an omnidirectional direction or multiple directions;
    transmitting signals in a first direction in case that the first type of LBT succeeds in the first direction and a second direction;
    performing a second type of LBT in the second direction in case that the signals are transmitted during a time duration in the first direction; and
    transmitting the signals in the second direction after the second type of LBT succeeds in the second direction.

2. The method according to claim 1, wherein the omnidirectional direction or multiple directions are identified based on predefined beam groups.

3. The method according to claim 1, wherein the transmitting node transmits signals in multiple directions in one transmission burst.

4. The method according to claim 1, wherein
    time needed for performing the second type of LBT is shorter than time needed for performing the first type of LBT.

5. The method according to claim 3, wherein in case that the first type of LBT is performed simultaneously, the method further comprises:
    with regard to a direction k, which first passes the first type of LBT, performing a third type of LBT in the direction k in a preset time period before other directions finish the first type of LBT, and transmitting the signals in a direction j corresponding to the direction k after passing the third type of LBT in the direction k;
    wherein time used for performing the third type of LBT is shorter than time used for performing the first type of LBT.

6. The method according to claim 1, wherein the transmitting node is an eNB, and the transmitting of the signals in the second direction comprises: transmitting a discovery reference signal (DRS) in the second direction.

7. The method according to claim 6, wherein in case that the DRS is transmitted by the eNB, the DRS of each direction in a discovery measurement timing configuration (DMTC) window is transmitted, a transmitting position of the DRS of the each direction in the DMTC is fixed.

8. The method according to claim 7, wherein performing, in case that the LBT performed by the eNB is omnidirectional LBT, the first type of LBT comprises at least one of the followings:
    performing the omnidirectional LBT before a starting point of a first DRS in the DMTC window; transmitting the signals in a direction j comprises: in the DMTC window, not transmitting the DRS before passing the omnidirectional LBT, transmitting the DRS of a corresponding direction from a transmitting position of a first DRS behind a position, which has passed the omnidirectional LBT, and successively transmitting the rest of DRSs in the DMTC; and/or
    performing, in case that the LBT performed is directional LBT, the first type of LBT comprises: performing the directional LBT of a corresponding direction before a transmitting position of each DRS in the DMTC, not transmitting the DRS of the corresponding direction in case that the directional LBT is not passed, and transmitting the DRS of the corresponding direction after passing the directional LBT.

9. The method according to claim 6, wherein in case that the DRS is transmitted by the eNB, the DRS of each direction in the DMTC window is transmitted by the eNB, a transmitting sequence of the DRS of the each direction in the DMTC window is fixed and a starting position of the DRS of the each direction in the DMTC is not fixed.

10. The method according to claim 9, wherein
    in case that the LBT performed by the eNB is omnidirectional LBT, performing the first type of LBT comprises: performing the omnidirectional LBT before a possible starting point of a first DRS in the DMTC, performing the omnidirectional LBT before a next possible starting point of the first DRS in case that the omnidirectional LBT is not passed, until the omnidirectional LBT is passed; transmitting the signals in a direction j comprises: in the DMTC window, in case that the omnidirectional LBT is passed, transmitting a DRS of a first direction from a possible starting point of a first DRS after passing the omnidirectional LBT, and successively transmitting DRSs of all directions in the DMTC window; and/or in case that the LBT performed by the eNB is directional LBT, performing the first type of LBT comprises: in the DMTC window, performing the directional LBT of the each direction in turn according a transmitting sequence of the DRS of each direction; wherein performing the directional LBT of the each direction comprises: performing the directional LBT before a possible starting point of the DRS of the each direction, performing the directional LBT before a next possible starting point of the DRS of this direction in case that the directional LBT is not passed, until the directional LBT is passed; wherein transmitting the signals in the direction j comprises: in case that the directional LBT of one direction is passed, transmitting the DRS of the direction from a possible starting position of the first DRS of the corresponding direction after passing the directional LBT.

11. The method according to claim 6, wherein in case that the DRS is transmitted by the eNB, the DRS of each direction in the DMTC window is transmitted by the eNB; in case that a transmitting sequence and starting position of the DRS of the each direction in the DMTC is not fixed, direction information of a DRS is carried in case that the DRS is transmitted.

12. The method according to claim 6, wherein in case that performing, by the eNB, the LBT in multiple directions simultaneously is possible, transmitting the DRSs in directions, which the LBT succeeds, comprises: simultaneously transmitting the DRSs in the multiple directions, which the LBT succeeds.

13. The method according to claim 8, wherein a number of directional DRSs are preset by the eNB, and/or a transmitting period for a DRS of a different direction is set by the eNB independently.

14. The method according to claim 3, wherein signals transmitted in multiple directions are beam measurement signals;
in case that the beam measurement signals are transmitted with data signals, the first type of LBT used for transmitting data is adopted;
in case that the beam measurement signals are transmitted, time used for performing the first type of LBT is shorter than time used for performing the LBT adopted by the transmission of the data.

15. A device for transmitting signals on an unlicensed frequency band (UFB), the device comprising:
a transceiver; and
a processor is coupled with the transceiver and configured to:
perform a first type of listen before talk (LBT) in an omnidirectional direction or multiple directions
transmit signals in a first direction in case that the first type of LBT succeeds in the first direction and a second direction;
perform a second type of LBT in the second direction in case that the signals are transmitted during a time duration in the first direction; and
transmit the signals in the second direction after the second type of LBT succeeds in the second direction.

* * * * *